US005716273A

United States Patent [19]

Yuen

[11] Patent Number: 5,716,273
[45] Date of Patent: Feb. 10, 1998

[54] APPARATUS AND METHOD FOR CONTROLLING EDUCATIONAL AND AMUSEMENT USE OF A TELEVISION

[76] Inventor: Henry C. Yuen, P.O. Box 1159, Redondo Beach, Calif. 90278

[21] Appl. No.: 540,749

[22] Filed: Oct. 11, 1995

Related U.S. Application Data

[63] Continuation of Ser. No. 282,084, Jul. 28, 1994, abandoned.

[51] Int. Cl.$^6$ ............................................ A63F 9/18
[52] U.S. Cl. ........................ 463/29; 403/47; 434/324; 434/332
[58] Field of Search ..................... 273/48 B; 463/29, 463/47; 434/322, 332, 323; 364/410

[56] References Cited

U.S. PATENT DOCUMENTS

| | | |
|---|---|---|
| Re. 28,598 | 10/1975 | Baer et al. . |
| Re. 32,282 | 11/1986 | Baer . |
| Re. 32,305 | 12/1986 | Baer . |
| 3,546,791 | 12/1970 | Koos et al. . |
| 3,789,136 | 1/1974 | Haith et al. . |
| 3,879,332 | 4/1975 | Leone ............................. 348/1 |
| 3,999,307 | 12/1976 | Tsuda et al. ..................... 434/323 |
| 4,052,798 | 10/1977 | Tomita et al. . |
| 4,247,106 | 1/1981 | Jeffers et al. . |
| 4,348,696 | 9/1982 | Beier ............................... 358/188 |
| 4,422,105 | 12/1983 | Rodesch et al. . |
| 4,490,810 | 12/1984 | Hon . |
| 4,588,901 | 5/1986 | Maclay et al. ..................... 348/1 |
| 4,592,546 | 6/1986 | Fascenda et al. . |
| 4,759,060 | 7/1988 | Hayashi et al. . |
| 4,796,223 | 1/1989 | Sugita et al. . |
| 4,858,930 | 8/1989 | Sata . |
| 4,877,408 | 10/1989 | Hartsfield . |
| 4,905,280 | 2/1990 | Wiedemer . |
| 5,001,632 | 3/1991 | Hall-Tipping . |
| 5,009,603 | 4/1991 | Fong et al. ....................... 434/323 |
| 5,034,807 | 7/1991 | Von Kohorn . |
| 5,035,625 | 7/1991 | Munson et al. .................. 434/332 |
| 5,051,822 | 9/1991 | Rhoades . |
| 5,051,837 | 9/1991 | McJunkin ......................... 348/1 |
| 5,057,915 | 10/1991 | Von Kohorn . |
| 5,060,079 | 10/1991 | Rufus-Isaacs . |
| 5,065,345 | 11/1991 | Knowles et al. . |
| 5,120,076 | 6/1992 | Luxenberg et al. . |
| 5,142,358 | 8/1992 | Jason ................................ 358/93 |
| 5,144,663 | 9/1992 | Kudelski et al. . |
| 5,172,413 | 12/1992 | Bradley et al. . |
| 5,231,661 | 7/1993 | Harnum et al. .................. 348/1 |
| 5,286,036 | 2/1994 | Barabash ......................... 434/332 |

Primary Examiner—Jessica Harrison
Assistant Examiner—James Schaaf
Attorney, Agent, or Firm—Christie, Parker & Hale, LLP

[57] ABSTRACT

Apparatus and methods are provided for controlling educational and amusement use of a television. The apparatus includes a switch for switching an output between an amusement input and an educational input. The output is coupled to a television input. A measuring device measures the amusement input when it is switched to the output. A controller device controls switching of the educational input to the output when the measuring device measures a predetermined value for the amusement input and the, controller keeps score of a user's responses to the educational material displayed on the television and controls switching of the amusement input to the output when the user attains a predetermined score. In a specific embodiment the measuring device includes a timer for measuring the time the amusement input is switched to the output and the controller switches the educational input to the output when the timer measures a predetermined time. In another specific embodiment the measuring device includes a counter for measuring the number of times a game on the amusement input is played when the amusement input is switched to the television and the controller switches the educational input to the output when the counter measures the game being played a first predetermined number of times. A memory for storing educational material is coupled to the educational input and the controller. The apparatus can include a tuner and a decoder for decoding educational material contained in a television signal. The decoder can include a vertical blanking interval decoder.

68 Claims, 20 Drawing Sheets

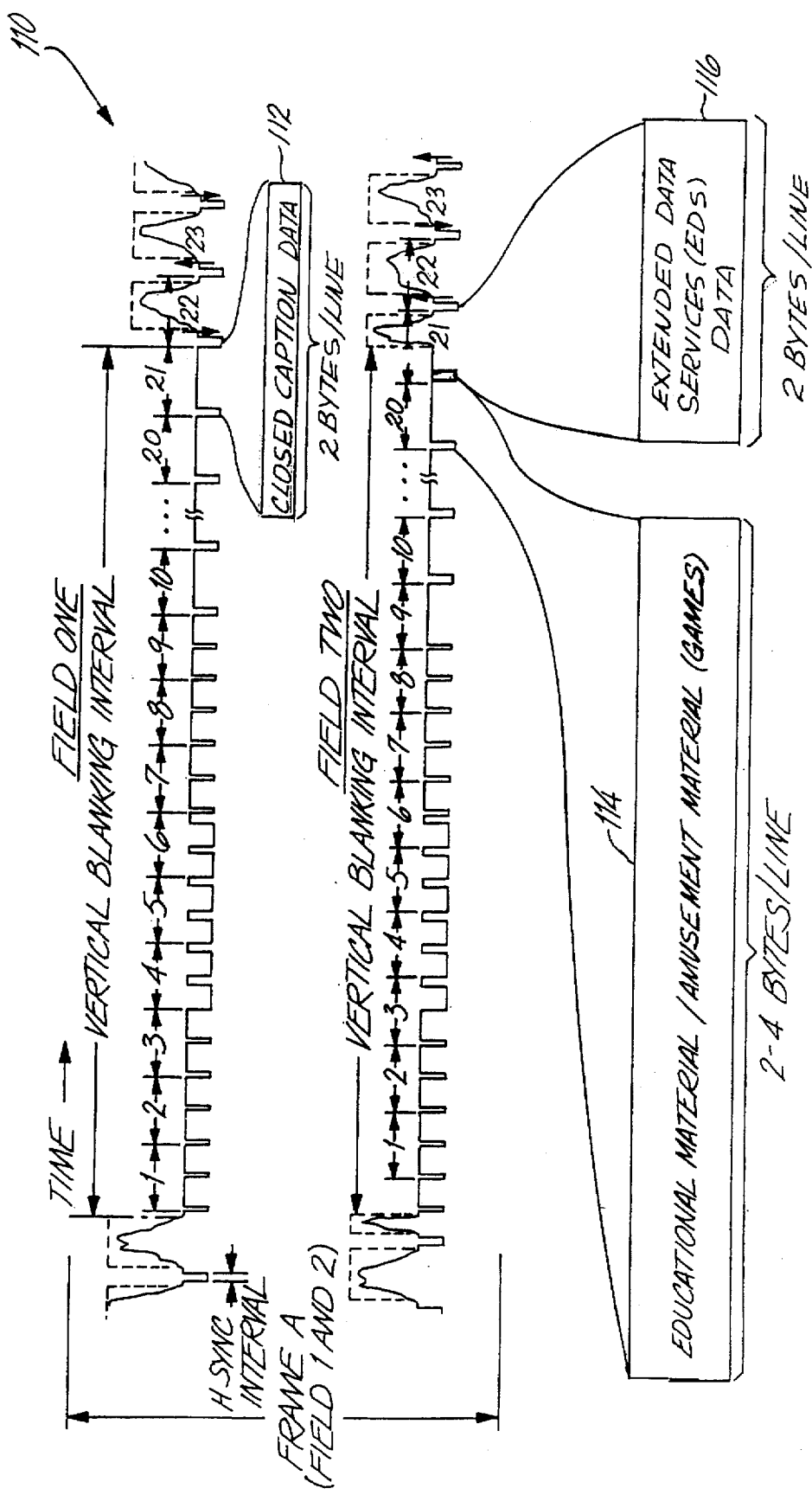

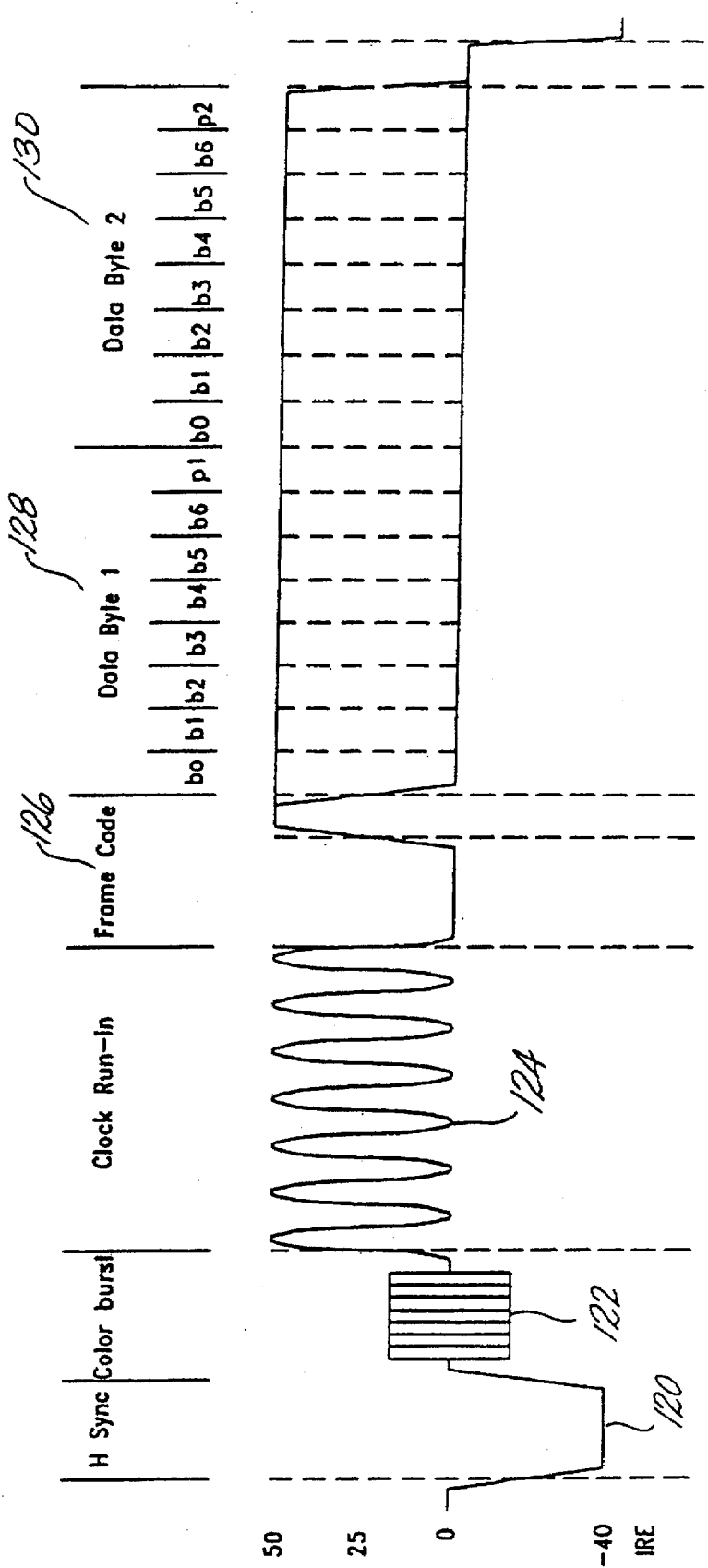

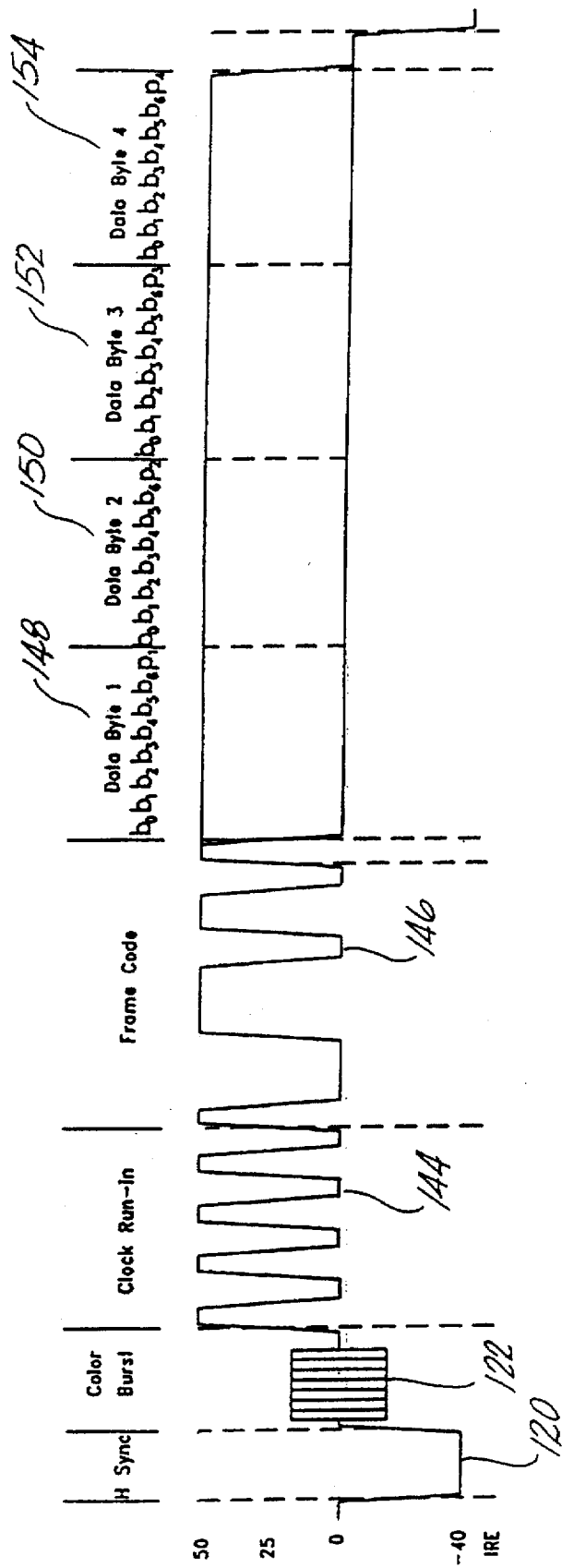

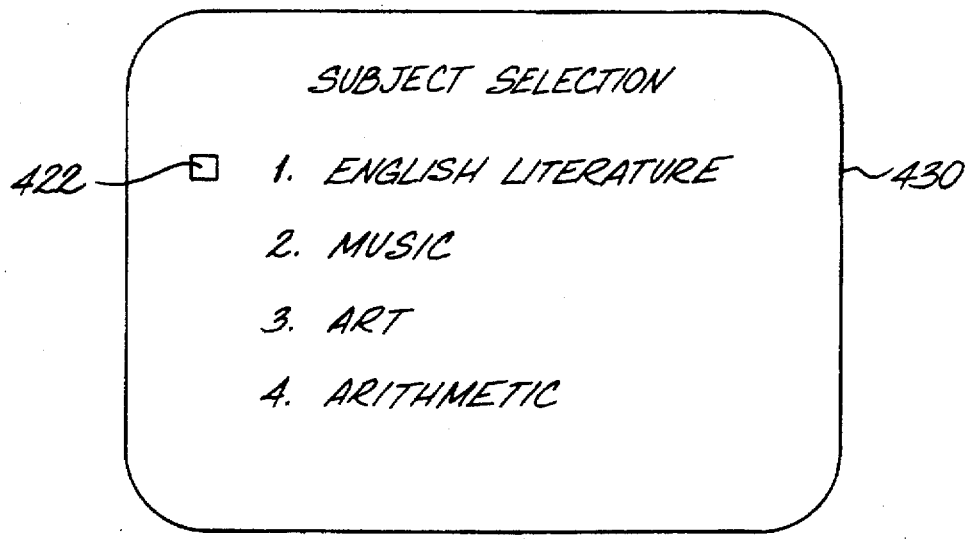
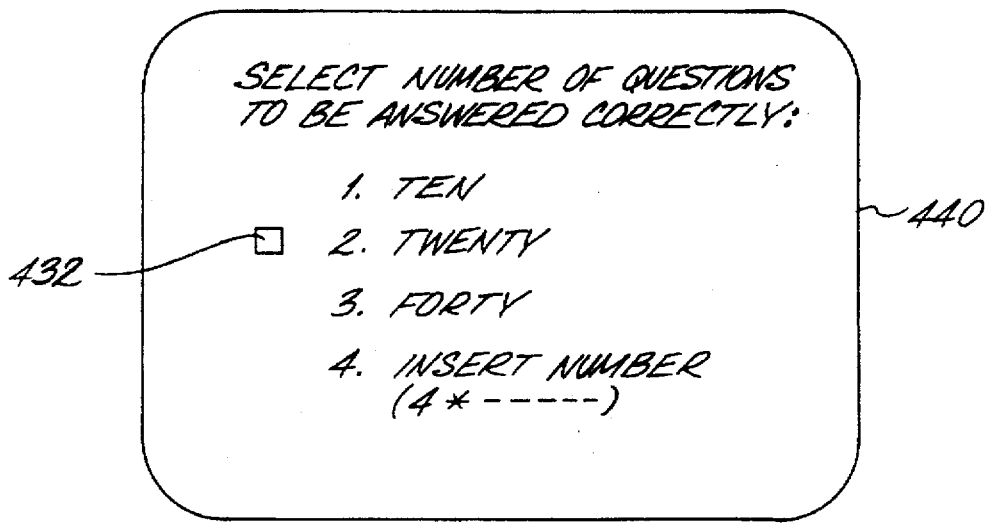

Fig. 9i

WHO IS THE AUTHOR OF:
"TO BE OR NOT TO BE, THAT IS
THE QUESTION."
 1. CARL SAGAN
 2. ALBERT EINSTEIN
 3. SHAKESPEARE
 4. FRANCIS BACON
 5. HELP
CHOOSE 1,2,3 OR 4

Fig. 9j

WILLIAM SHAKESPEARE LIVED FROM:
 1. 1909 - 1964
 2. 1420 - 1482
 3. 1780 - 1831
 4. 1564 - 1616
 5. HELP
CHOOSE 1,2,3,4 OR 5
(OR SEE CH 5, PAGE 30 OF ENGLISH
LITERATURE TEXT BOOK)

*Fig. 9k*

HELP LESSON

WILLIAM SHAKESPEARE 1564-1616
ENGLISH POET & DRAMATIST
CALLED BARD OF AVON

SOME FAMOUS PLAYS:

HAMLET
RICHARD III
AS YOU LIKE IT
A MIDSUMMER NIGHTS DREAM
MACBETH

```
                    SCREEN NO.: 52
                    USER PRIZE CODE: 142

PRIZES:
        1. MARBLES
        2. BASEBALL CARDS
        3. COMIC BOOK
        4. POGS
   TELEPHONE 1-800-554-1022 GIVE
   PRIZE SELECTION, SCREEN NO.,
        & USER PRIZE CODE
```
~510

Fig. 9m

```
   SUBJECT:
   "ENGLISH LITERATURE"

LAST SESSION SCORES
      NO. ANSWERED CORRECTLY = 180
      NO. ANSWERED INCORRECTLY = 20
      % CORRECTLY = 90 %

EDUCATIONAL TIME = 60 MIN
      AMUSEMENT TIME = 30 MIN
```
~530

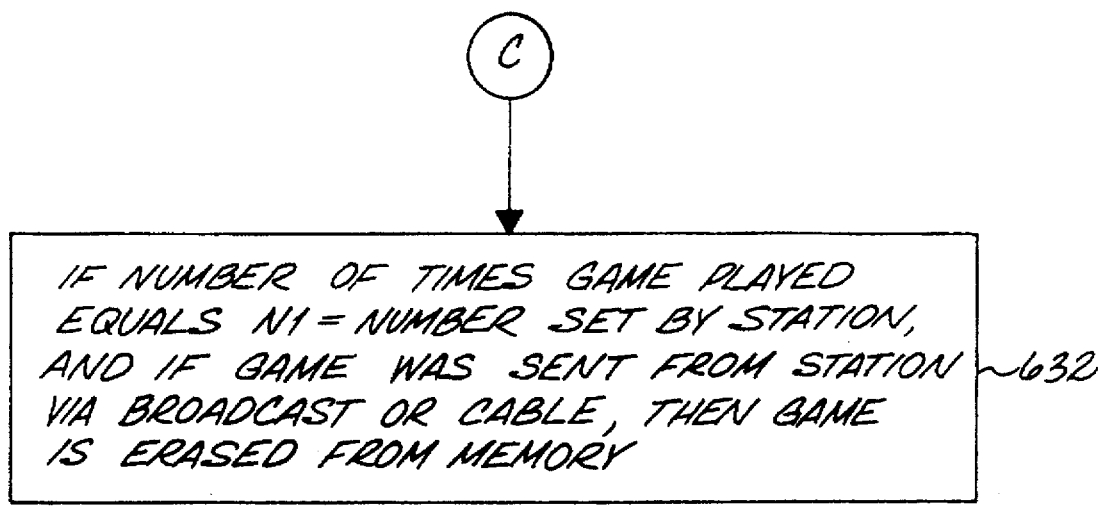

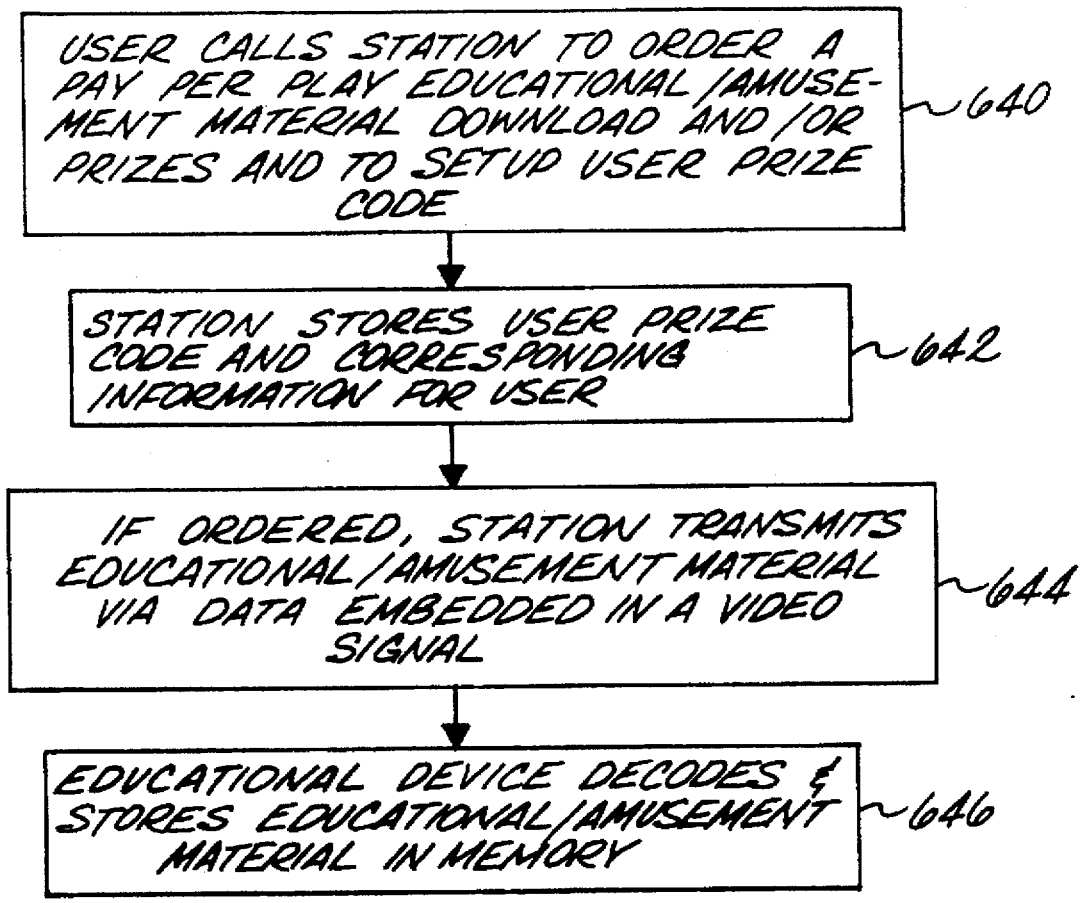

APPARATUS AND METHOD FOR CONTROLLING EDUCATIONAL AND AMUSEMENT USE OF A TELEVISION

CROSS-REFERENCE TO RELATED APPLICATION

This is a continuation of application Ser. No. 08/282,084, filed Jul. 28, 1994, now abandoned.

BACKGROUND OF THE INVENTION

1. Field of the Invention

This invention relates generally to television systems and in particular to apparatus and methods for controlling educational and amusement use of a television.

2. Description of the Related Art

Television watching and television game playing have become a major past-time for young children. The amount of time spent on these activities has become alarmingly high, and many educators and parents identify this habit as one of the most detrimental and threatening to a youngster's education. On the other hand, these activities are often condoned by parents, who use the television as a baby-sitter. Peer pressure also makes it difficult to control television and television game activities. Thus, there is a need for a device which will inject into television and television game activities an educational element.

U.S. Pat. No. 5,035,625 (Munson) discloses a computer game teaching method and system in which educational information is presented to a student while playing a computer game. By interrupting game playing, the teaching program selects a question from a selected tutorial module and displays the selected question to the student. The student's responses are then tabulated. If the student answers questions correctly, then the scoring algorithm for the game is modified to permit the student to achieve higher scores in the game.

U.S. Pat. No. 5,009,603 (Fong) discloses another system which employs a standard television receiver in an educational application. A microprocessor cooperates with a digital memory, a video generator, a sound generator, and a voice synthesizer to generate a display of a pictorial representation upon the television receiver. A child's correct response is compared to the correct response stored in the digital memory and if the response is correct, the pictorial representation associated with a particular question becomes animated to provide an indication to the child of the correctness of the child's response.

U.S. Pat. No. RE 32,282 (Baer) discloses the use of a standard television receiver for educational purposes. Questions are displayed and answers by the user are recorded. A coupling apparatus is provided by which a user can manually switch from using a television receiver for educational purposes to playing games or watching broadcast programs and vice-versa. The manual switch avoids the necessity of destroying a permanent connection such as a soldered connection.

A shortcoming of Baer is that the user is free to either spend time watching television or playing games on the television or switching to the educational material. In Munson the educational material only allows the user to obtain a greater score while playing games on the television. While this is some motivation to use a television for educational material rather than amusement material, the primary affect is to motivate the user to play more TV games. Also, if the user in Munson wants to watch a normal television broadcast program, the user is free to do so. The user is also free to watch normal television broadcast programs in the disclosed Fong system.

To curb television watching and television game playing or at least to control the time spent on these activities, apparatus and methods are needed for controlling the educational and amusement use of a television.

SUMMARY OF THE INVENTION

It is an objective of the invention to provide a switch which will be automatically switched between an amusement input and an educational input to control the user of a television.

It is another objective of the invention to measure the amusement use of a television and to switch the television to a educational input when the amusement use exceeds a predetermined threshold. It is another objective of this invention to reward a user who obtains a good score while answering questions displayed on a television, with the use of the television for amusement purposes for a period of time.

It is another objective of the invention to provide apparatus for allowing parents to control the subject matter of the educational material, the number of questions to be answered correctly to obtain a good score, and the time of amusement use allowed after the requisite number of questions have been answered correctly. It is another objective of the invention to provide a system which can access educational material from a removable memory media or can receive educational material downloaded via a television video transmission and stored. It is another objective of the invention to allow game material to be downloaded via a video transmission. Another objective of the invention is to allow a parent to determine how many times a game may be played before the amusement use of a television will be interrupted and the television switched to an educational use.

It is another objective of the invention to allow a parent to prepurchase a certain dollar value of prizes for a child whereby when the child scores a win, he or she may choose a prize and communicate with a central station via a telephone line to obtain the prize.

In accordance with the invention, apparatus and methods are provided for controlling educational and amusement use of a television. The apparatus includes a switch for switching an output between an amusement input and an educational input. The output is coupled to a television input. A measuring device measures the amusement input when it is switched to the output. A controller device controls switching of the educational input to the output when the measuring device measures a predetermined value for the amusement input and the controller keeps score of a user's responses to the educational material displayed on the television and controls switching of the amusement input to the output when the user attains a predetermined score. In a specific embodiment the measuring device includes a timer for measuring the time the amusement input is switched to the output and the controller switches the educational input to the output when the timer measures a predetermined time. In another specific embodiment the measuring device includes a counter for measuring the number of times a game on the amusement input is played when the amusement input is switched to the television and the controller switches the educational input to the output when the counter measures the game being played a predetermined number of times. A memory for storing educational material is coupled to the educational input and the controller. The apparatus can include a tuner and a decoder for decoding educational material contained in a television signal. The decoder can include a vertical blanking interval decoder.

Other objects and many of the attendant features of this invention will be more readily appreciated as the same becomes better understood by reference to the following detailed descriptions and considered in connection with the accompanying drawings in which like reference symbols designate like parts throughout the figures.

BRIEF DESCRIPTION OF THE DRAWINGS

FIG. 6 is a timing diagram showing the vertical blanking interval (VBI) lines of field 1 and field 2 of a interlaced raster scanning pattern of a conventional television;

FIG. 7 is a timing diagram of the standard data format (1X) for transmitting data in the VBI;

FIG. 8 is a timing diagram of the accelerated data format (2X) for transmitting data in the VBI.

FIGS. 9a–9m are representative television screen images displayed on a television by the educational device according to the present invention;

FIGS. 10a–10c are flow diagrams illustrating the operation of the educational device according to the present invention;

FIG. 11 is a flow diagram showing the interaction of a user with a station according to the present invention;

DETAILED DESCRIPTION

Figure 1:
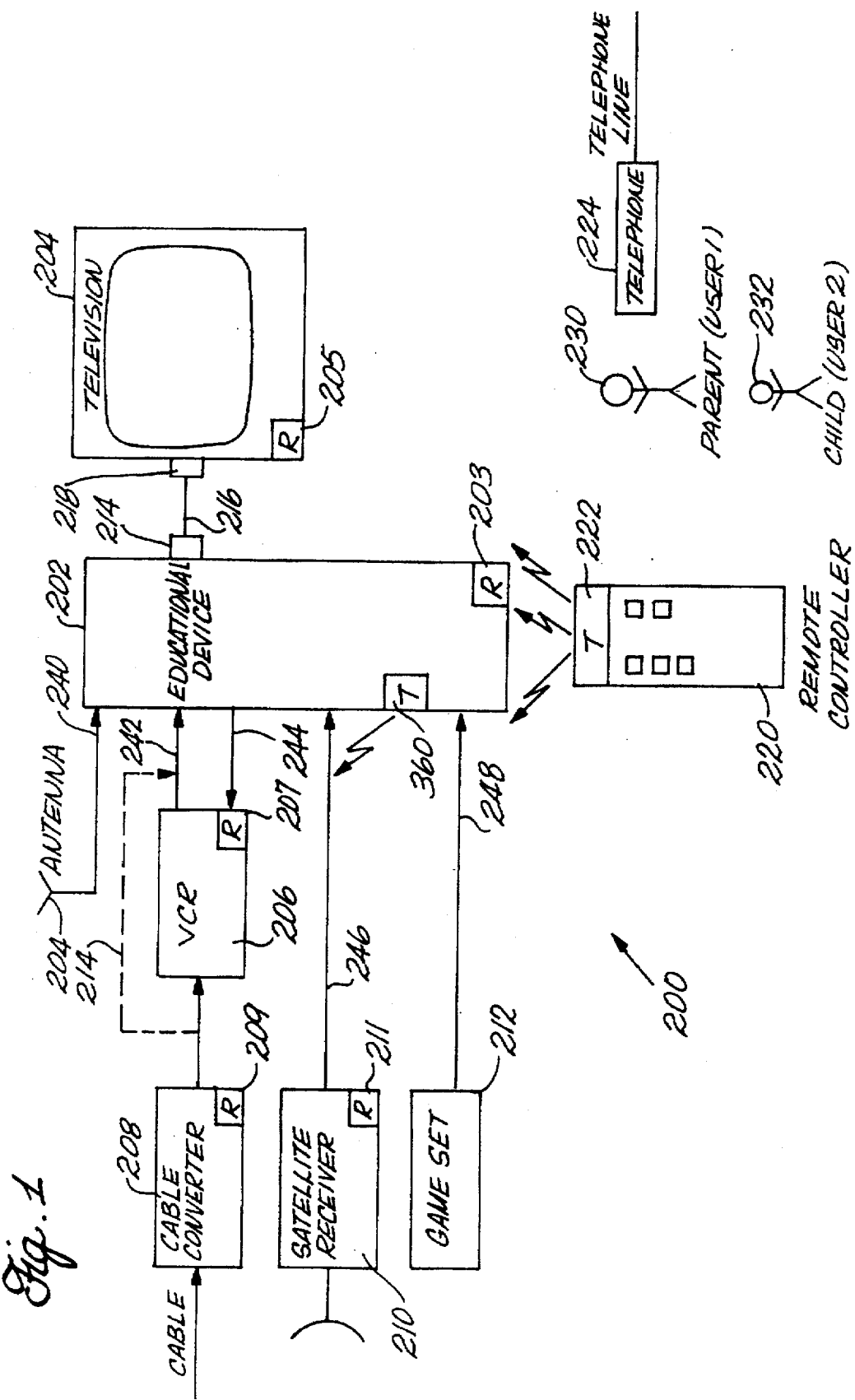
FIG. 1 is a system including an educational device for controlling the educational and amusement use of a television according to the present invention.

Referring to the drawings and more particularly to FIG. 1, a system 200 is shown for controlling the educational and amusement use of a television 204. An educational device 202 is coupled between the television 204 and sources of amusement, which can include a VCR 206 a satellite receiver 210, a game set 212 and a conventional television antenna. The amusement input can also be via cable and a cable converter box 208 which can be connected directly to educational device 202 via line 213 or the VCR 206. A remote controller 220 can send signals via transmitter 222 to the television, the educational device, the VCR, the cable converter, and the satellite receiver, which have receivers 205, 203, 207, 209 and 211, respectively. The transmitters and receivers can operate via infrared or RF signals.

Generally a parent 230 (user 1) will initialize and set up the educational device 202 in order to control the educational and amusement use of television 204 by a child 232 (user 2). In order to prevent the child 232 from bypassing educational device 202, the cable 216 between the educational device 202 and the television 204 is attached via locking connectors 214 and 218.

A telephone 224, which communicates with a station, is also part of the system and can be used by the parent 230 and the child 232 in order to communicate with the station. As will be explained the parent 230 can communicate certain setup information to the station and the child 232 may claim prizes from a station if the parent has previously ordered the prizes. The interaction of the parent 230 and the child 232 with the station will be more apparent in the following description.

Figure 2:
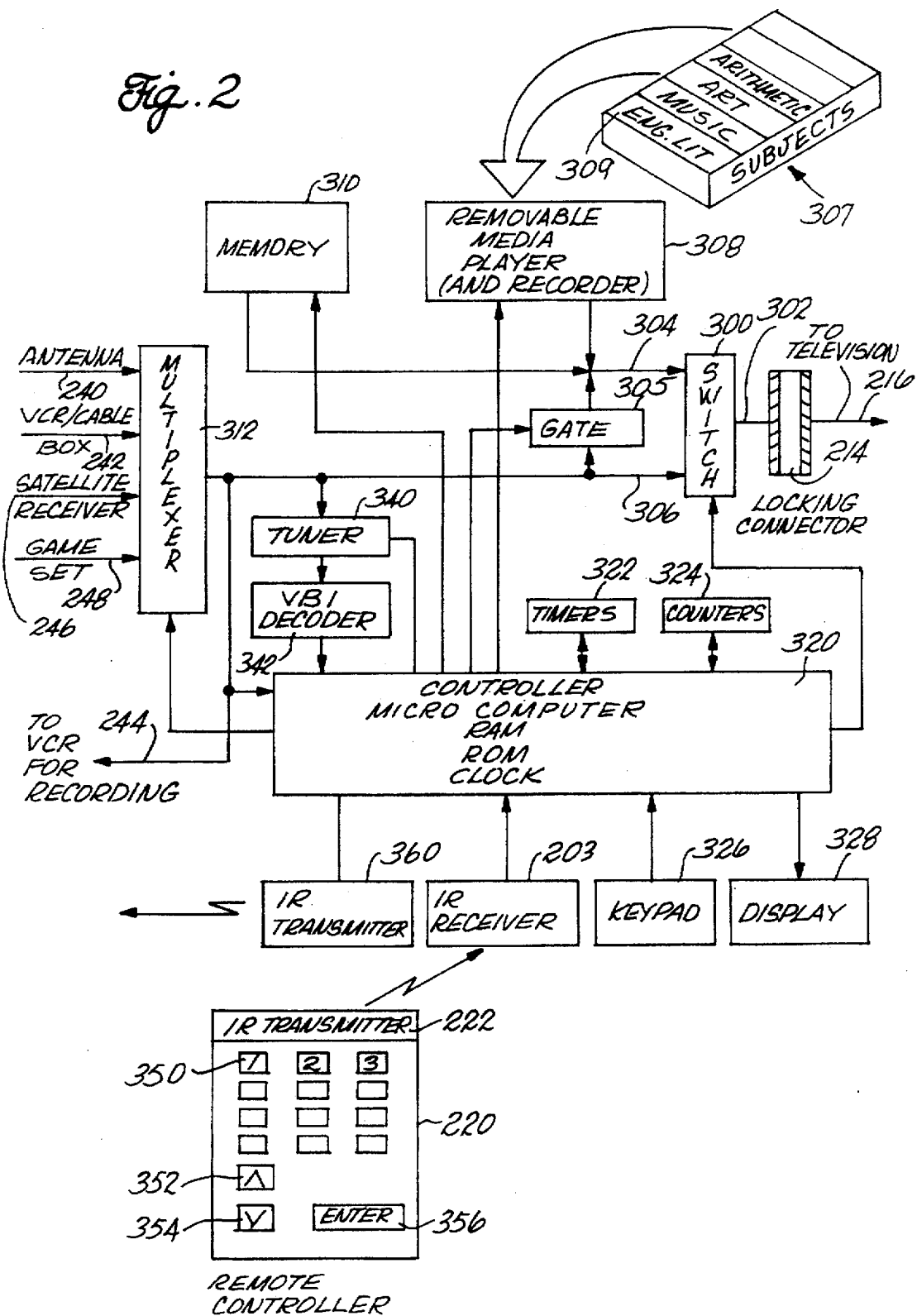
FIG. 2 is a block diagram of the educational device of FIG. 1 for controlling the educational and amusement use of a television according to the present invention.

A block diagram of educational device 202 is shown in FIG. 2. A switch 300 controls the output of the educational device 302 which is connected to the television through locking connector 214 and cable 216. The input to the switch is line 304 on which educational material is sent to the television and line 306 on which amusement material is sent to the television. One manner of providing educational material is to sell prerecorded educational subjects 307 to the parent 230. As shown the subjects might include English literature, music, art, arithmetic and other subjects. The parent 230 selects a particular subject such as English literature 309 and loads this removable memory media into removable media player 308. The switch 300 and the removable media player are controlled by controller 320, which can be a microcomputer.

The amusement input line 306 to switch 300 is the output of multiplexer 312 which has inputs 240, 242, 246 and 248 from the antenna, VCR/cable box, satellite receiver, and game set, respectively. Since many of the inputs to multiplexer 312 are various sources of television programming, the output of multiplexer 312 can be sent to the VCR 206 for recording, as indicated for output 244. The output of multiplexer 312 is also sent to controller 320, which can measure the time that the amusement input is switched to the television through switch 300 by using timers 322 that are coupled to controller 320.

Another way of obtaining educational material is to download the educational material in a television signal via the antenna, the cable box, or the satellite receiver. The signal is selected by tuner 340 which tunes to the proper channel and then the embedded educational material is extracted from the television signal by VBI decoder 342. The tuner 340 is controlled by controller 320. Other material such as games can be also sent along with the educational material and embedded in the video signal. Once the vertical blanking interval decoder 342 extracts the embedded material, it is sent by controller 320 to either memory 310 or to the removable media player 308. The latter destination is applicable if the removable media player can also function as a recorder. The vertical blanking interval decoder and its relationship to a video signal is further explained below. Once the educational material and other material such as games are stored in memory 310 or on removable media player 308, then the educational material can be accessed under the control of the controller 320 and sent on educational input 304 to switch 300.

Rather than have a removable media player and possibly a recorder as part of educational device 202, it is also possible for the educational device 202 to control the VCR 206 to provide the functions of the removable media player 308. The educational device 202 already receives an input 242 from the VCR and has an output 244 to the VCR 206, which can be used for recording. By providing the educational device 202 with an IR transmitter 360 which could also function as an RF transmitter, the VCR 206 can be controlled by the controller 320 in the same manner as the controller controls removable media player 308. When the VCR 206 is accessed for educational material, then the educational material is sent through multiplexer 312 and through gate 305, which is controlled by controller 320, so that the educational material may be presented to switch 300 on educational input 304.

As shown in FIG. 2 the educational device 202 also includes a keypad 326 and a display 328 which are used for control and monitoring purposes. The remote controller 220 contains number keys 350, an up key 352 and a down key 354. Also an enter key 356 is provided on the remote controller.

As is further explained below the educational device controls the educational and amusement use of the television by measuring the amusement input when it is switched to the output of the educational device. When the amusement input is switched to the output of the educational device, then the measurement of the amusement input can take two forms. In one form the measurement is the amount of time the amusement input is switched to the output. In another form the measurement is the number of times a game on the amusement input is played. The time that the amusement input is switched to the output can be measured using timers 322. The number of times a game on the amusement input is played can be measured using counters 324. After a user such as the child 232 uses the television for a predetermined time or plays a game a predetermined number of times, the switch 300 is switched under control of controller 320 to the educational input. Educational materials are accessed from memory 310, removable media player 308, or VCR 206 and applied to the educational input and through switch 300 to the television 204. The controller 320 keeps score of a user's responses to educational material displayed on the television. When the user such as the child 232 attains a predetermined score on the educational material displayed on the television, then the controller 320 switches switch 300 to the amusement input 306.

In one manner of operating the educational device a game program is downloaded with the educational material and is embedded in a video signal transmitted via cable, satellite or over the air. As discussed above the educational material is extracted by vertical blanking interval decoder 342 and stored, for example, in memory 310.

Figure 3:
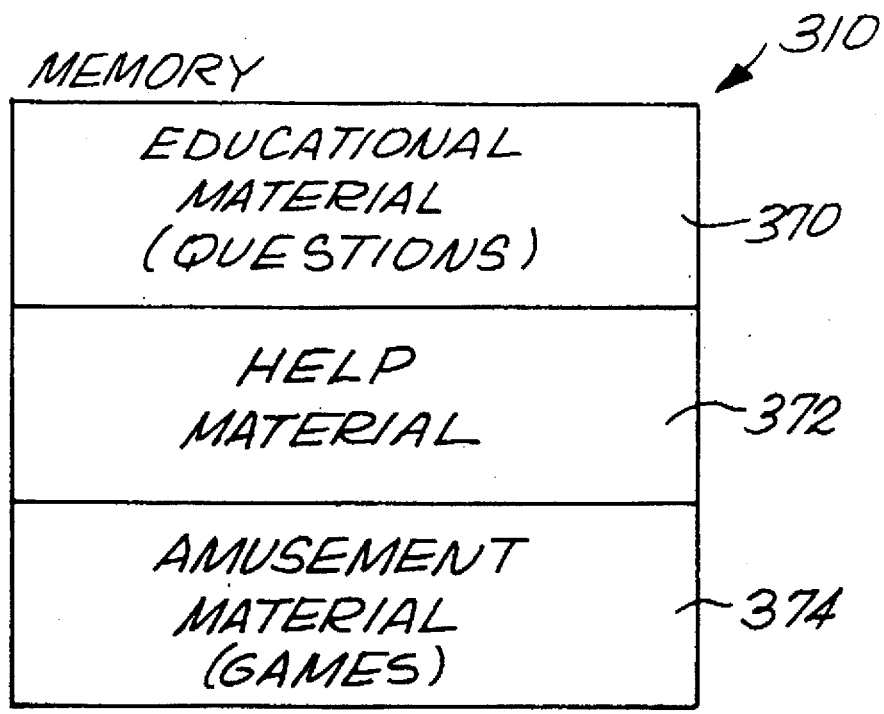
FIG. 3 is a memory map of a memory containing educational material, help material, and amusement material according to the present invention.

FIG. 3 shows the information that can be stored in memory 310, including educational material 370, help material 372 and amusement material 374. The help material is, in actuality, a subset of the educational material 370. The educational material 370 has questions concerning the selected subject and the help material contains a tutorial on the subject. If a child does not know the answer to a question, then the child can access the help material in order to further the child's understanding of the subject. The amusement material can contain games.

Educational material and amusement material that is obtained from a transmitted video signal, is generally paid for via a pay-per-view or pay-for-play system, in which the user, in this case the parent 230, calls a station and pays for the educational material and the amusement material that will be transmitted. In one embodiment of the educational device, the amusement material that is obtained via the pay-for-play system and stored in a memory such as memory 310, is erased after the game has been played a predetermined number of times. This effectively limits the number of times the educational material and amusement material that is downloaded with a video signal can be used which ensures the station of repeat business and continued revenue.

The following description describes the manner in which educational material and amusement material can be embedded in a video signal at a station and decoded at a receiver.

Video images in a cathode ray tube (CRT) type-video device, e.g. television, are generated by scanning a beam along a predefined pattern of lines across a screen. Each time all the lines are scanned, a frame is said to have been produced. In one implementation, such as used in the United States, a frame is scanned 30 times per second. Each television frame comprises 525 lines which are divided into two separate fields, referred to as field 1 ("odd field") and field 2 ("even field"), of 262.5 lines each. Accordingly, these even and odd fields are transmitted alternately at 60 Hz. The lines of the even and odd fields are interleaved to produce the full 525 line frame once every 1/30 of a second in a process known as interlacing. Another standard in the world uses 625 lines of information and interlace 312 and 313 lines at 50 fields per second. In the 525 line standard used in the United States, approximately 480 lines are displayed on the television screen.

Figure 4:
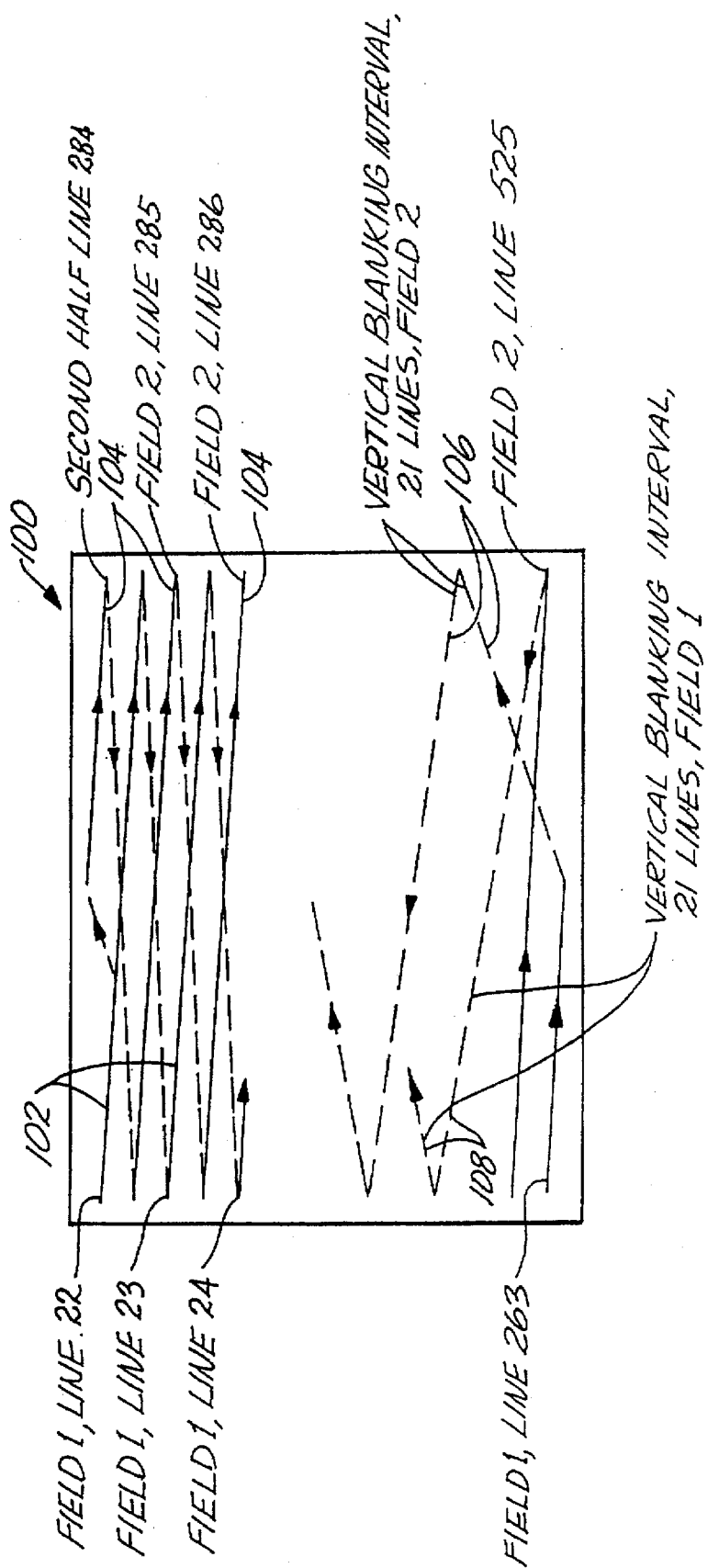
FIG. 4 is a schematic diagram illustrating an interlaced raster scanning pattern of a conventional television.

FIG. 4 is a schematic diagram illustrating the interlaced scanning pattern 100 on a screen of a conventional television receiver. A video display scans the beam from the top left hand corner and scans across the screen (line 22, field 1 in FIG. 4). After it finishes scanning the first line, the beam returns to the left hand side during a period known as a horizontal blanking interval and repeats scanning along another line which is parallel to but lower than the previous line (line 23, field 1 in FIG. 4). The scanning continues along the lines until the beam reaches the center of the bottom part of the screen (line 263, field 1) to complete field 1, which is comprised of lines 102.

From the bottom center of the screen, the beam returns to the top where it starts scanning from substantially the center of the screen along the lines 104 for field 2 which interlace the lines of field 1. This is not an instantaneous bottom to top jump but actually requires the length of time to scan 21 horizontal lines. These lines 106 are lines 1 through 21 of field 2. The second half of line 21 field two (line 284 as shown in FIG. 4) is displayed. Then lines 285 to 525 of field 2 are scanned to complete field 2. When the beam reaches the bottom, right hand corner of the screen, the picture frame is formed. Then the beam retraces to the top and the vertical blanking interval lines 108 are numbered 1 through 21 of field 1. In the NTSC protocol widely used in North America, each field contains 262.5 horizontal lines and a pair of fields constitute a single 525 line video frame and creates one video picture at one instant in time on the video display.

During the time in which the beam returns from the bottom to the top of the screen between the fields, it carries no video or picture signals because it does not produce any picture element on the screen. This time interval is generally known as the vertical blanking interval (VBI). Its duration is typically 21 times the time duration that it takes the beam to scan across the screen. In other words, the duration of the VBI is equal to the time for the beam to scan 21 lines and is divided into 21 lines. In interlaced scanning, the VBI is identified by the field with which it is associated. Apparatus and methods using the NTSC standard with 21 lines in each VBI are well known in the art and therefore are not discussed in detail herein.

Because no image is produced on the display during the vertical blanking interval, no picture information therefore needs to be carried by the broadcast signals. Thus, the VBI is used for conveying auxiliary information from a television network or station to an audience. For example, closed captioned data associated with the television program are transmitted as encoded composite data signals in VBI line 21, field 1 of the standard NTSC video signal, as shown in FIG. 6.

Lines 1 through 9 of the VBI of each field are used for vertical synchronization and post equalizing pulses. Thus, lines 10 through 21 are available for auxiliary information.

Figure 5:
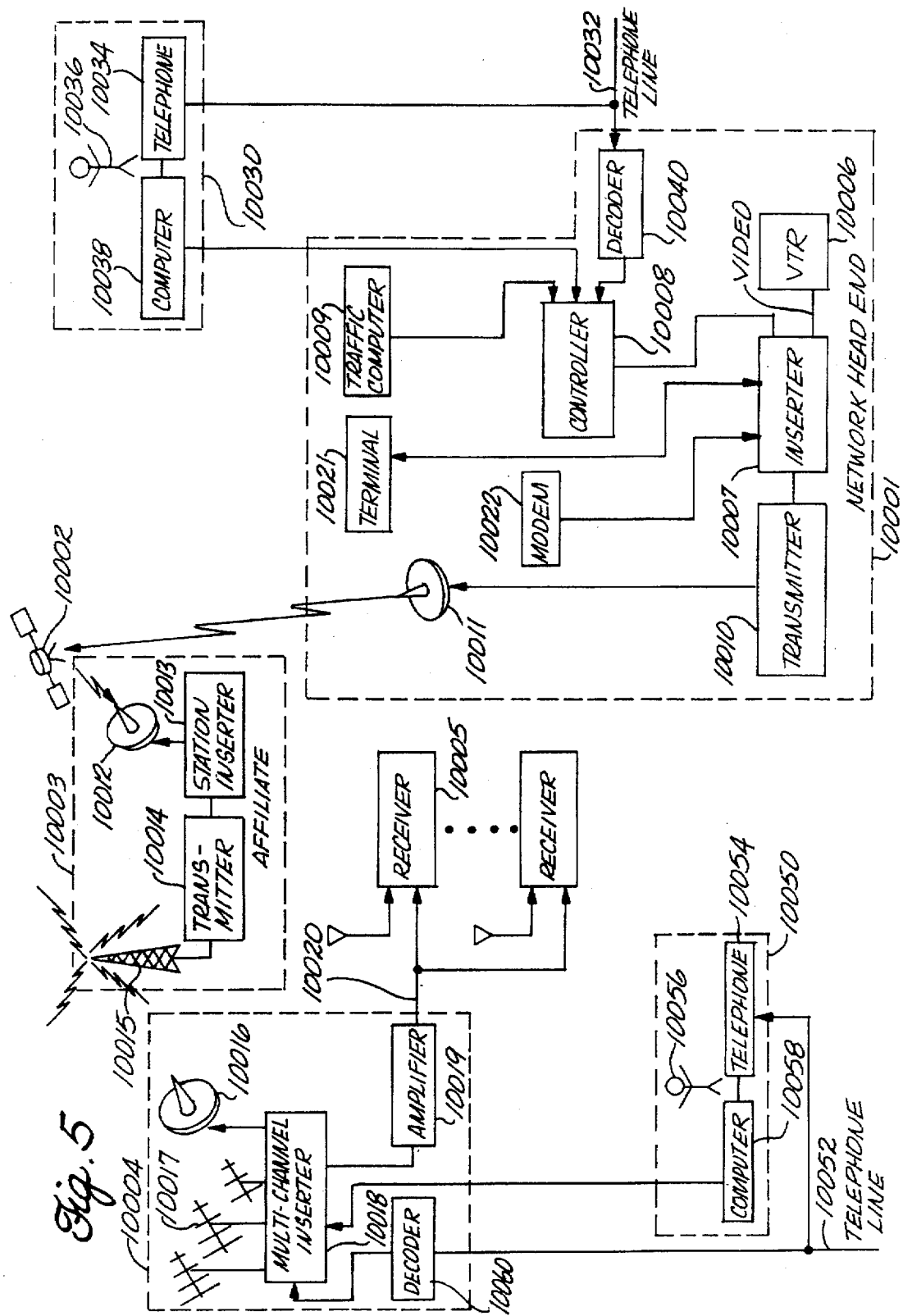
FIG. 5 is a functional block diagram of a television video and data transmission system.

FIG. 5 is a functional block diagram of a data transmission system. As used herein, the terms "broadcast" and "transmit" are used interchangeably for the transmission of signals over cable or fiber optics, to or from satellites, over the air, and the like. A network head end 10001 transmits a composite television signal containing inserted information in a portion thereof, typically the vertical blanking interval (described above in conjunction with FIG. 4), to a satellite 10002 which rebroadcasts the same to a local affiliate 10003. The affiliate 10003 may further insert data into the vertical blanking interval of the received television signal and transmit the same to a local cable head end 10004. The cable head end 10004 receives television signals from a plurality of sources (including satellites) and may further insert data into the vertical blanking interval of any of the television signals. The signals from the plurality of sources are combined into a composite television signal, amplified, and provided over a cable to a plurality of receivers 10005. In addition, the receivers 10005 may receive signals directly from the local affiliate 10003 by air, which may include the use of a satellite 10002, or by cable.

More specifically, the network head end has a video tape recorder (VTR) 10006 for providing a program signal to an inserter 10007. A controller 10008 also at the head end controls the scheduling of loading tapes from a cart (a machine with a plurality of video tape cassettes which are moved by a robotic arm from a storage location and inserted into a video tape recorder and vice versa). Furthermore, the controller 10008 controls the lighting of stages during live broadcasts, such as news broadcasts. The controller 10008 is typically a microprocessor based system. A traffic computer 10009 controls the exact timing of playing individual segments of video tapes and inserting commercials therebetween as well as switching between different programs. Some network head ends have both a traffic computer 10009 and a controller 10008. The controller 10008 provides data and commands to the inserter 10007. The traffic computer 10009 provides data and commands to the controller if present. Otherwise, the traffic computer 10009 provides these signals directly to the inserter 10007. The inserter 10007 inserts data into the vertical blanking interval of the composite television signal, as will be described below, and provides the television signal to a transmitter 10010 which in turn provides the television signal on a microwave carrier to a satellite dish 10011 for transmission to the satellite 10002.

The satellite 10002 retransmits the received signal, which is received by a satellite dish 10012 at the affiliate 10003. The dish provides the signal to a station inserter 10013 at the local affiliate 10003. The affiliate may also insert data into the composite television signal as will be described below. The television signal is then provided to a transmitter 10014 and then to a transmitting antenna 10015.

A local cable operator 10004 has a plurality of satellite 10016 dishes and antennas 10017 for receiving signals from a plurality of networks 10001 and affiliates 10003. The received signal from each of the dishes 10016 and antennas 10017 is provided to a respective input of a multi-channel inserter 10018, which can input data into the vertical blanking interval of a received signal. The multi-channel output from the inserter 10018 is amplified in an amplifier 10019 and provided over a cable 10020 to receivers 10005. Alternately the receivers 10005 could receive broadcast information via antennas or satellite receivers.

Data inserted in the VBI can be recovered at each receiver 10005, which can include an educational device 202, by the VBI decoder 342 that scans VBI lines 10–21 of both fields 1 and 2. In addition it is possible to decode VBI data in the first few visible lines in each video frame, for example, lines 22–24. Lines 1 through 9 are typically used for vertical synchronization and equalization and, thus, are not used to transmit data. Closed captioning and text mode data are generally transmitted on VBI line 21, field 1 of the standard NTSC video signal, at a rate of 2 bytes for each VBI line 21, field 1, as shown by closed caption data 112 in FIG. 6. The text mode fields fill the entire screen with text. The default mode is an open ended mode in which the page is first filled up and then scrolled up. The individual recipient of such data has no control over the data. Extended data services (EDS) data can be transmitted on VBI line 21, field 2, as shown by EDS data 116 in FIG. 6, at a rate of 2 bytes per VBI line 21, field 2.

Under mandatory FCC requirements effective July 1993, color televisions having a size 13" and greater must provide a closed caption decoder. Caption data decoding is further described in the following specifications, which are hereby incorporated by reference herein: Title 47, Code of Federal Regulations, Part 15 as amended by GEN. Docket No. 91-1; FCC 91-119; "CLOSED CAPTION DECODER REQUIREMENTS FOR THE TELEVISION RECEIVERS"; Title 47, C.F.R., Part 73,682(a)(22), Caption Transmission format; Title 47, C.F.R. Part 73.699, FIG. 6; "TELEVISION SYNCHRONIZING WAVE FORM"; Title 47, C.F.R., Part 73.699, FIG. 17A; "LINE 21, FIELD 1 DATA SIGNAL FORMAT"; and PBS Engineering Report No. E-7709-C, "TELEVISION CAPTIONING FOR THE DEAF: SIGNAL AND DISPLAY SPECIFICATIONS".

Under the extended data services (EDS) proposed in the Recommended Practice for Line 21 Data Service, Electronics Industries Association, EIA-608 (drafts Oct. 12, 1992 and Jun. 17, 1993) (hereinafter referred to as "EIA-608" standard", the subject matter of which is incorporated by reference, additional data is provided in line 21, field 2 of the vertical blanking interval. This requirement includes two closed captioning fields, two text mode fields and the extended data services. The extended data includes, among other information, program name, program length, length into show, channel number, network affiliation, station call letters, UCT (universal coordinated time) time, time zone, and daylight savings time usage. Upstream at the network, the network inserts the program name, the length of the show, the length into the show, the network affiliation, and the UCT time. Downstream at the affiliate, the affiliate inserts the channel number, the time zone, the daylight savings time usage and program names. The network inserts the data that does not differ for different affiliates.

It is possible for the inserter to insert data other than closed captioning data and EDS data into the television signal. The station inserted data can include data such as educational material and amusement material including games, which can be inserted into either or both fields in any VBI line between 10 and 20. For example the data can be inserted into line 20 of field 2, as shown by data 114 in FIG.

6. The data may be inserted into the VBI at the closed caption rate (1X format) or at two times the closed caption rate (2X format), which is further explained below.

The data may be manually entered from a local terminal 10021, which can be used to pre-build, recall, or edit messages. The terminal 10021 typically includes a computer. In addition, a modem 10022 may be used to provide data to the inserter 10007. The output of the inserter 10007 is a composite television signal with the data inserted.

The timing of video signals in NTSC format is well known in the art. As described above, the vertical blanking interval is the time between the flyback from the bottom of the screen to the top of the screen. Although no video signal is displayed, the horizontal synchronization pulses are still provided during the VBI. The standard data transmission rate is defined in the EIA-608 standard.

As shown in FIG. 7, the horizontal synchronization pulse 120 is followed by color burst signals 122. For closed caption and EDS data, a clock run-in cycle 124 follows the color burst which in turn is followed by a frame code 126. The clock run-in is "10101010101." The frame code is "01000011." Two data bytes 128 and 130 are transmitted in each VBI line. Each byte is 8 bits including a parity bit. This format is referred to as the standard data rate format (or 1X format). Each byte in the VBI line is arranged with the least significant byte first. The last bit is used as parity for error checking. Each byte of the transmitted data is parity checked upon receipt. The 1X format is the format used to transmit closed captions in VBI line 21 field 1, as shown by closed caption data 112 in FIG. 6. It is also the format used to transmit EDS data in VBI line 21 field 2, as shown by EDS data 116 in FIG. 6.

An accelerated data format (2X format) as shown in FIG. 8 uses a bit rate twice that of the 1X format to thereby provide 4 bytes per VBI line. The clock run-in 144 is the bit sequence "10101010." The frame code 146 is "10011101101." Four data bytes 148, 150, 152 and 154 are transmitted each VBI line. The 2X format can be used to transmit educational material and amusement material, as shown by data 114 in FIG. 6.

Figure 9A:
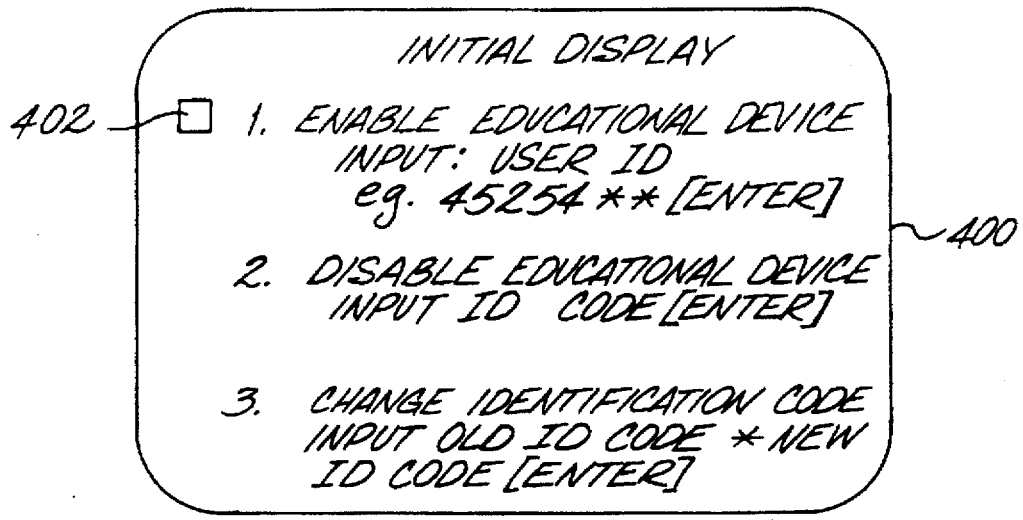
Figure 10A:
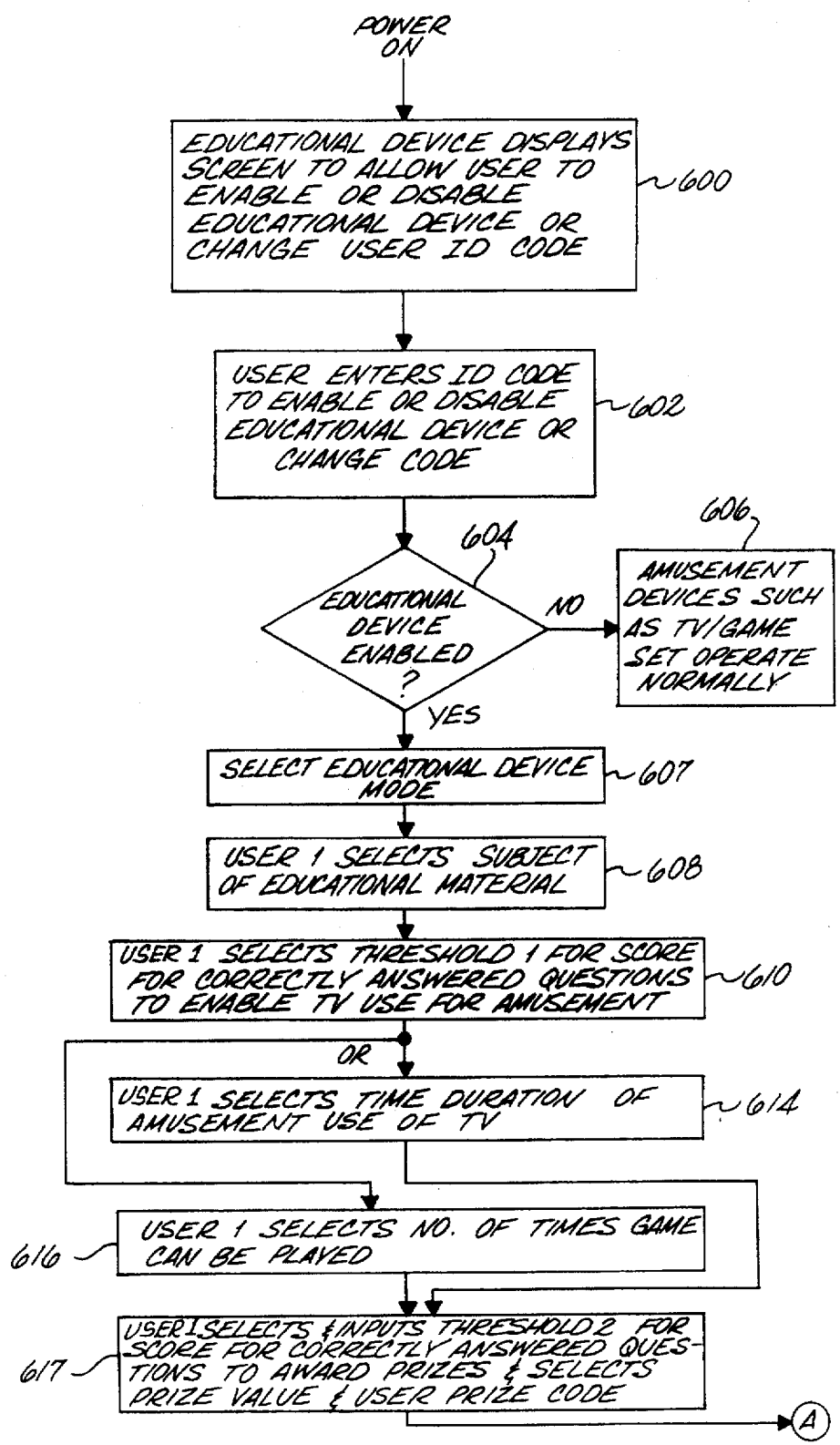
Figure 106:
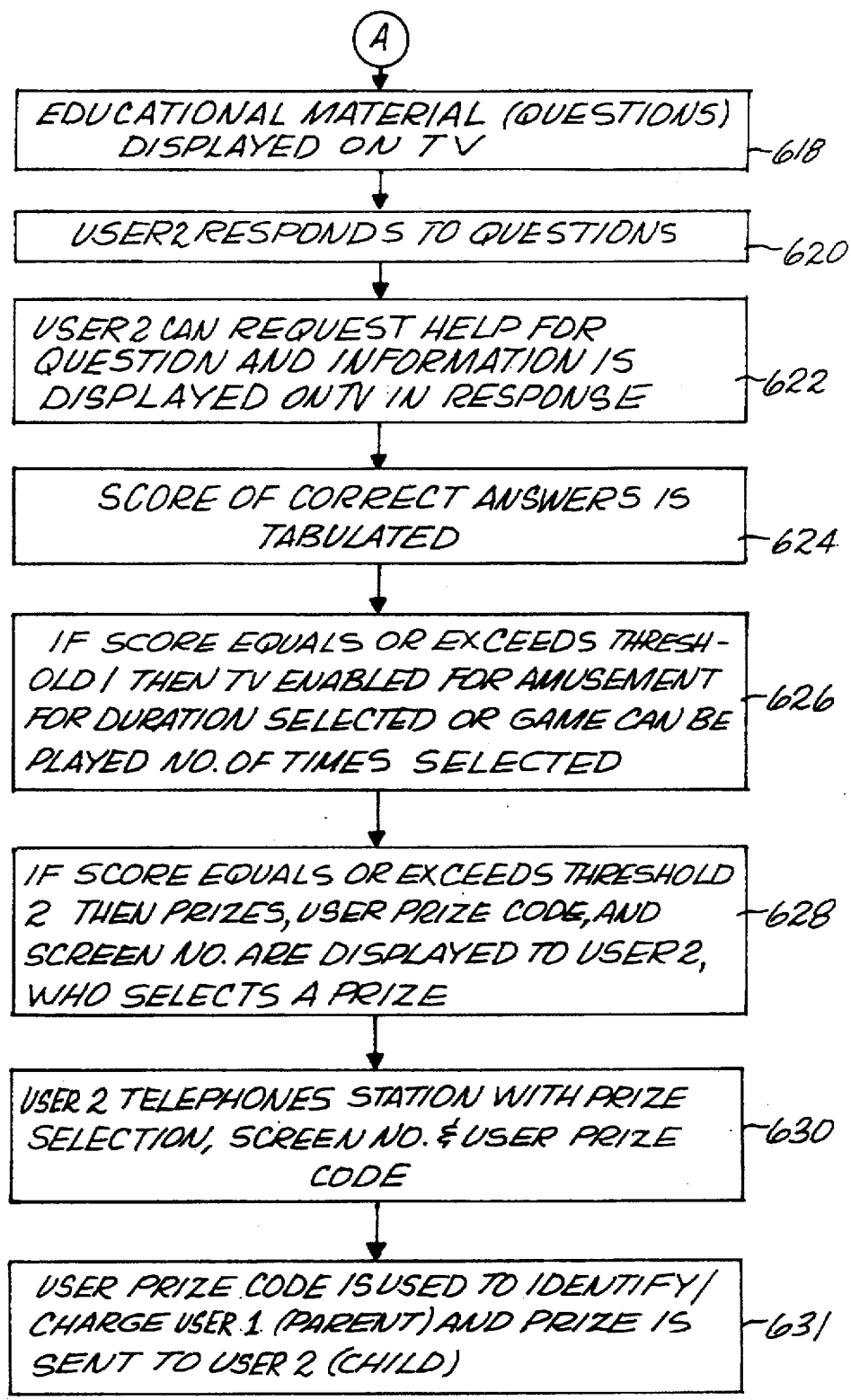

Now the operation of the system for controlling the educational and amusement use of a television will be described. The operation of the educational device will be described by relating the television screen shown in FIG. 9a–9n to the flow diagram of FIGS. 10, 11 and 12. Referring now to FIG. 10a and to step 600 in which the educational device displays a screen to allow a user to enable or disable the educational device or change a user ID code, step 600 gives a user who knows the user ID code, which is most likely the parent 230, the opportunity to disable the educational device or change the user ID code. FIG. 9a shows a representative initial display screen. By operating the remote controller 220 and the up/down buttons 352 and 354 and the enter button 356, the user can position a cursor 402 next to the desired operation. For example, if the user wishes to enable the educational device then the cursor 402 is put next to entry 1 and the user inputs a user code followed by two asterisks and then pushes the enter key on the remote control. To disable the educational device, the user places the cursor next to the second entry on the screen and enters an ID code followed by the enter key. If the parent needs to change the identification code to prevent the child 232 from obtaining the ID code, then the parent 230 would enter the old ID code followed by an asterisk followed by a new ID code and then press the enter key. Note that the user must always enter an ID code to enable or disable or change the code in the educational device as shown in step 602 of FIG. 10a.

If in step 604 of FIG. 10a it is determined that the educational device is not enabled, then the amusement devices including the TV inputs and a game set will operate normally as shown in step 606.

Figure 9B:
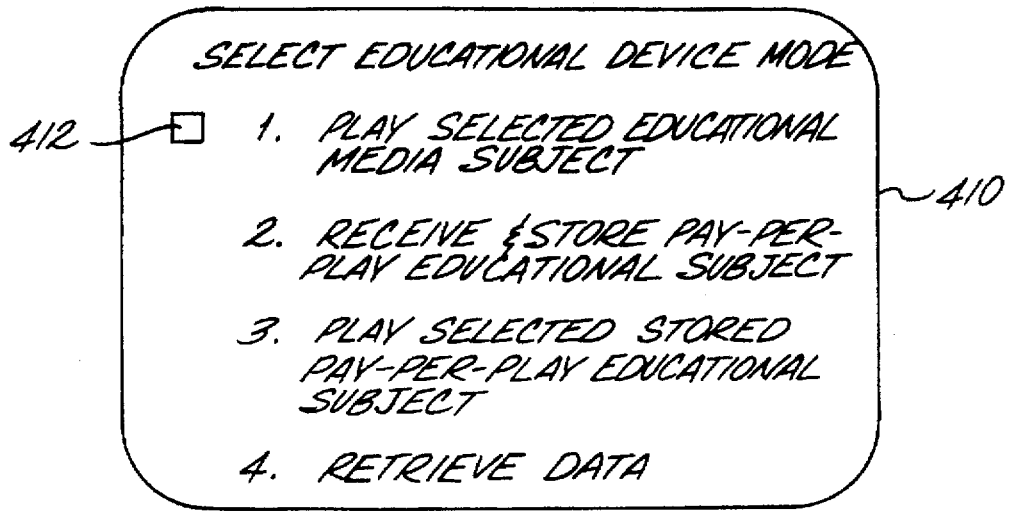

If the educational device is enabled, then the next step is for the user to select the educational device mode in step 607. FIG. 9b shows that the educational device can be put in a 1) mode of playing the selected educational media subject, 2) receiving and storing a pay-for-play educational subject, 3) playing a selected stored pay-for-play educational subject, or 4) retrieving data. First, modes 1 and 3 for playing educational material are described. If removable media are used, the user selects one of the subjects from the library 307 and inserts it into the removable media player 308. If pay-for-play educational subjects have been stored in memory 310, then a screen such as FIG. 9c can inform the user of the subjects that are stored and the user can select the desired subject. In step 608 the user selects the particular subject to play. This can be done as shown in FIG. 9c by selecting a particular subject such as English literature.

In step 610 the user can select a threshold for the score of correctly answered questions required for the user to cause the educational device to enable the TV to be used for amusement. An example screen that could be displayed to a user is shown in FIG. 9d. As illustrated, the user has selected that the threshold be set at 20 correctly answered questions as shown by the position of the cursor 432 and screen 430.

Figure 9E:
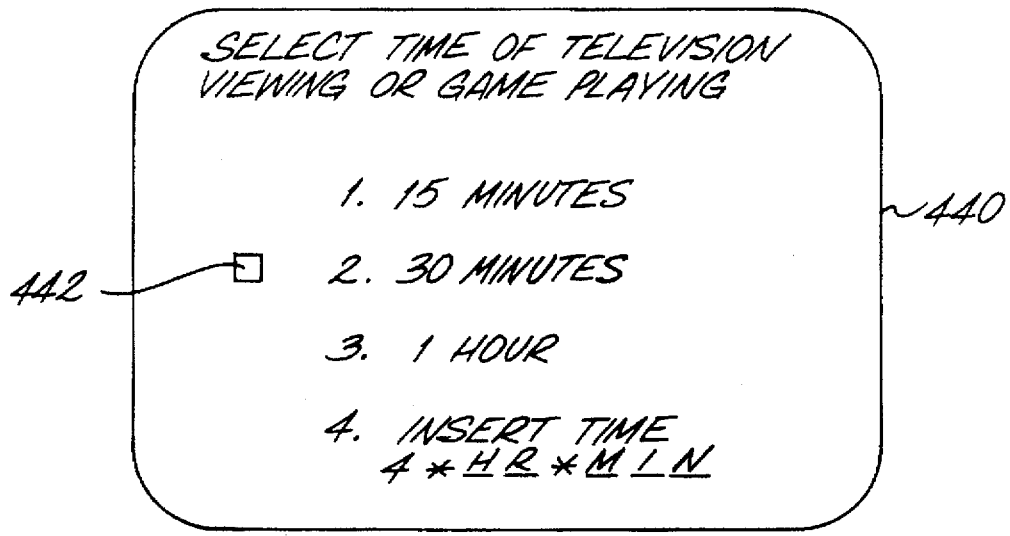
Figure 9F:
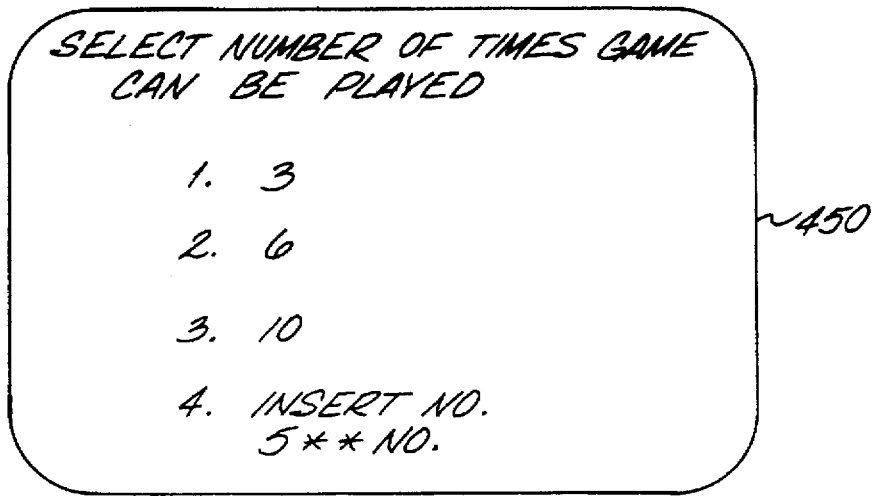

The next steps are for the user to either select a time that the TV can be used for amusement or selecting the number of times that a game can be played in steps 614 and 616, respectively. FIG. 9e shows a screen that can be displayed to the user to select the time of television viewing or game playing before the educational device will switch the television back to educational material. FIG. 9f is a screen that can be displayed to a user to enable the user to select the number of times a game can be played before the educational device will switch the television use back to educational material.

Figure 9G:
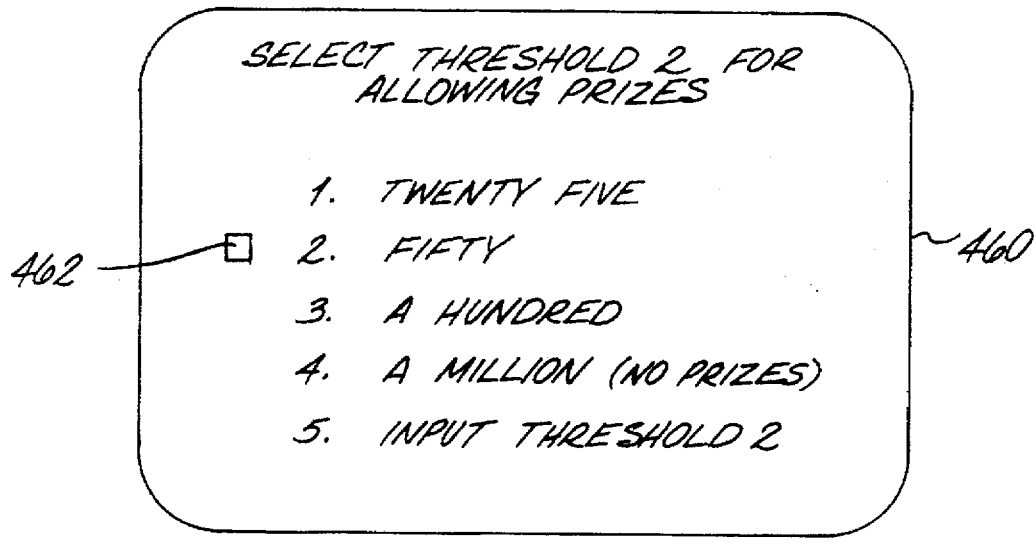
Figure 9H:
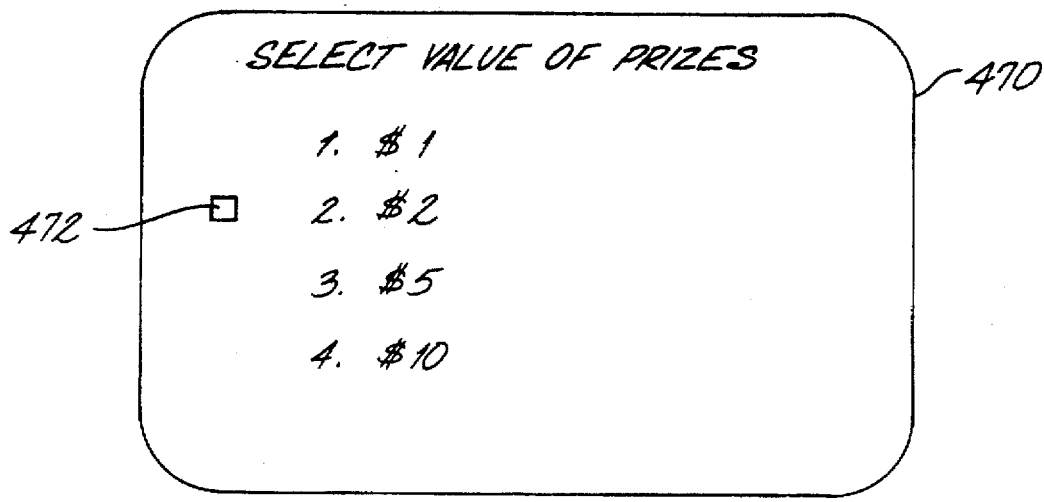

In step 617 the user can select a threshold for scores that would allow a user such as a child to select a prize. The parent can select the prize values and also enter a user prize code, which is also given to a station which the child can call to claim his/her prize. FIG. 9g shows a screen that can be displayed to allow the parent to select the threshold of correct answers that are required in order for a prize to be won. In this case the parent 230 has selected the second entry on the screen which is 50 correct answers as indicated by the position of cursor 462. The screen shown in FIG. 9h can be displayed to the user to enable the user to select a value for the prizes that will be displayed to a child.

Once the educational device has been initialized, then in step 618 the educational material is presented to the educational input of switch 300 and displayed on the television. The educational material consists of questions that are responded to by the user, who in this case would be most likely a child. The user responds to the questions in step 620 and the educational device keeps score of the correct answers to the questions. Example screens for educational material questions are shown in FIG. 9i and 9j. The user positions the cursor by using the remote control or the keypad on the educational device. Each question has multiple choices and one choice is HELP. For example, choice 5 in both FIG. 9i and 9j is HELP. If the user selects HELP, as shown in steps 622, then a help screen will be displayed. For example, a help lesson corresponding to the questions of FIG. 9i and FIG. 9j is shown in FIG. 9k, which in this case is a brief biography of William Shakespeare.

In step 624 the number of correct answers and the number of incorrect answers are tabulated by controller 320. If the number of correct answers or the score crosses a threshold which has been set by the parent, then the television is enabled for amusement for the time or the number of times a game can be played, as selected by the parent, as shown in step 626.

If the score of the correct answers crosses the threshold step for prizes, then the prizes and the user price code and possibly a screen identifier which identifies the screen to a station, are displayed to a user. FIG. 9*i* is an example screen that would be used to show prizes to a user. The screen 510 displays the prizes such as marbles, baseball cards, a comic book or pogs. The screen also displays a telephone number which is the telephone number of the station that the user can call to claim a prize and instructions to the user. The instructions indicate to the user to give the station the prize selection which could be, for instance, a comic book, the screen number which in this case is 52, and the user prize code which in this case is shown as 142. The screen number is used by the station in order to identify the screen that has been displayed to the user. The user prize code 142 is used by the station to identify the user that has paid for the prizes. The user prize code for example will identify the user's name, address, telephone number, and possibly a credit card number, which can be used to charge the value of the prize. In FIG. 10*b*, step 630 corresponds to the user telephoning the station with the prize selection, screen number and user prize code. In step 631 of FIG. 10*b* the user prize code is used to identify and charge the user (parent) and the prize is sent to the user which is normally a child.

FIG. 10*c* shows step 632, which applies to downloaded pay-per-play educational/amusement material. If the game that is included in the amusement material is played a number of times that is set by the station, then the game is erased from memory. As indicated above, this ensures that the station will have a continuing source of revenue from the users.

FIG. 11 is a flow diagram illustrating the interaction of a user with the station to order pay-per-play educational/amusement material and to order prizes. In step 640 the user telephones a station. As shown in FIG. 5, the station has a incoming telephone line 10032 which is connected to a telephone 10034. A representative 10036 can answer the phone and then insert the information given by the caller into a computer 10038 which can then communicate with controller 10008 at the network head end. Alternately, the user may communicate directly with the controller via telephone touchtones, which are decoded by decoder 10040. It is also possible that the user calls a local station, in which case the user would call telephone 10054 and a representative 10056 would enter the data into computer 10058 which would communicate with multi-channel inserter 10018. Alternately touchtones can be sent directly to decoder 10060.

When the user calls in step 640 the user can order a pay-per-play educational/amusement material download and/or prizes and the user can also select a user prize code. If the user has bought subjects on removable media such as that shown as English literature 309 in FIG. 1, then the user can play that removable media on removable media player 308. However, the purchased subjects could contain prize screens and instructions to call a station in the same manner as the pay-per-play educational/amusement material that is downloaded. So a parent may call a station only to order prizes and to set up a user prize code, which as discussed above identifies the user to the station. In step 642 the station stores the user prize code and corresponding information for the user. The corresponding information may include the user's name, address, telephone number, and a credit card number. In step 644, the station transmits the educational/amusement material via data embedded in a video signal. The transmission can be via a broadcast or via cable and is only transmitted if the user has ordered pay-per-play educational/amusement material from the station. Then, in step 646 the educational device decodes and stores the educational material in memory for later use by the user.

Figure 12:
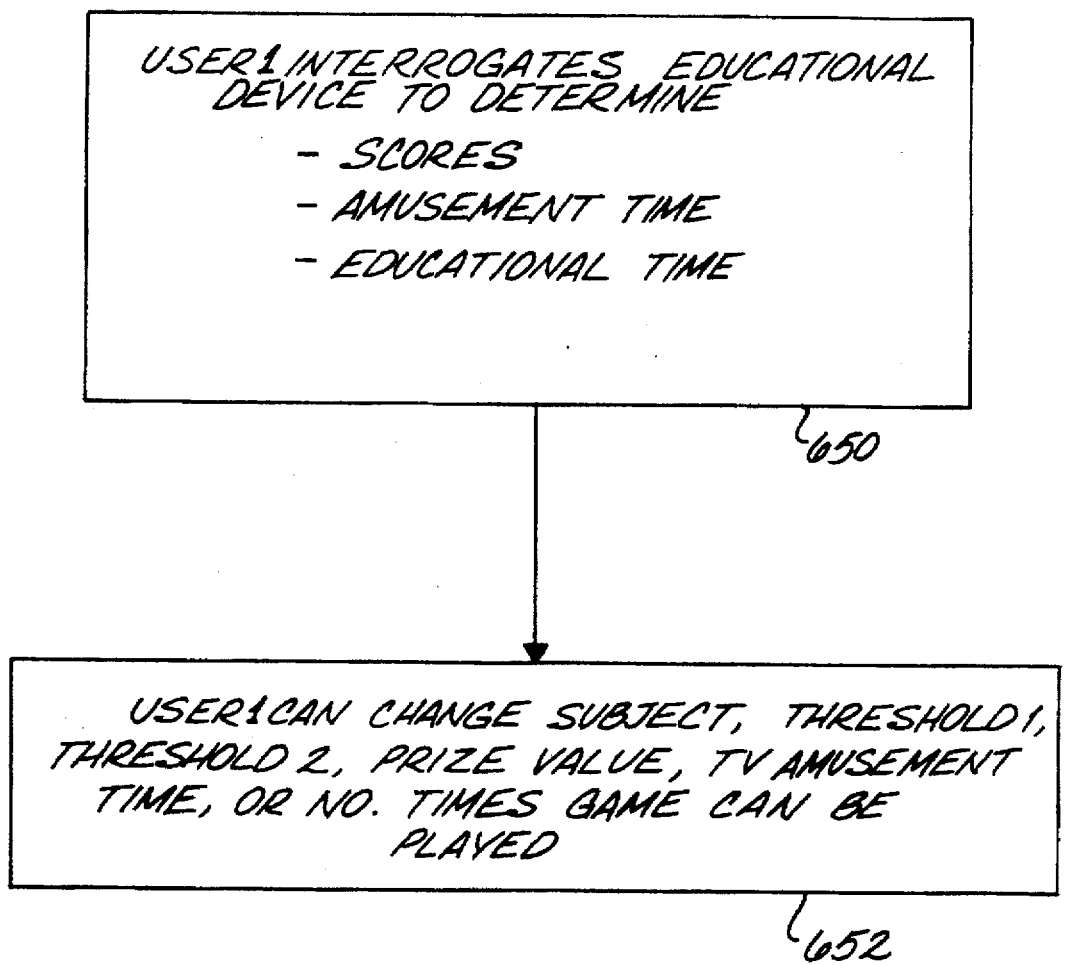
FIG. 12 is a flow diagram showing a method of interrogating the educational device for scores in order to determine adjustments to the educational device according to the present invention.

FIG. 12 is a flow diagram for interrogating the educational device and changing parameters in response to scores and other information stored in the education device. In step 650 the user interrogates the educational device to determine such things as the scores of users of the educational device and parameters such as the total amusement time and the total educational use of the television. The user does this by selecting the retrieve data mode in the educational device which is selection 4 in screen 410 of FIG. 9*b*. An example screen that indicates the scores and the educational amusement times is shown in screen 530 of FIG. 9*m*. In this case the screen shows that the number of questions answered correctly is 180 and the number of questions answered incorrectly is 20 for a total of 200 questions and a percent correct answers of 90%. The educational time is shown as 60 minutes and the amusement time is shown as 30 minutes. The educational time and the amusement time can be kept track of by timers 322 in FIG. 2.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

What is claimed is:

1. A method for controlling educational and amusement use of a television comprising the steps of:

displaying educational material on a television, the educational material containing at least one question;

scoring a first user's responses to questions in the educational material;

a second user entering a prize code identifier and establishing the prize code identifier at a station, the prize code identifier having the purpose of identifying the second user;

the second user entering a threshold for awarding a prize to the first user if a score is determined to equal or exceed the threshold; and displaying the prize code identifier to the first user on the television when the score is determined to equal or exceed the threshold.

2. The method of claim 1 further comprising the steps of:

communicating the displayed prize code identifier to the station; and awarding to the first user a prize corresponding to the displayed and communicated prize code identifier.

3. The method of claim 2 wherein the step of communicating the displayed prize code identifier to the station comprises the step of displaying a telephone number of the station on the television.

4. The method of claim 1 wherein the step of displaying the prize code identifier to the first user on the television comprises the step of displaying the prizes to the first user on the television to allow the first user to select a prize, when the score equals or exceeds the threshold.

5. The method of claim 1 further comprising the steps of:

transmitting a video signal containing the educational material encoded into the video signal.

6. The method of claim 5 further comprising the steps of:

decoding the educational material from the video signal; and storing the educational material.

7. The method of claim 1 further comprising the steps of:

transmitting a video signal containing amusement material encoded into the video signal.

8. The method of claim 7 further comprising the steps of:

decoding the amusement material from the video signal; and storing the amusement material.

9. A method for controlling educational and amusement use of a television comprising the steps of:

displaying educational material on a television, the educational material containing at least one question;

scoring a first user's responses to questions in the educational material;

switching the television to amusement material, if the score is determined to equal or exceed a first threshold;

timing the duration of time the television is switched to the amusement material;

switching the television to the educational material when the duration of time equals a predetermined value;

a second user entering a prize code identifier and establishing the prize code identifier at a station, the prize code identifier having the purpose of identifying the second user;

the second user entering a second threshold for awarding a prize to the first user, if a score is determined to equal or exceed the second threshold; and displaying the prize code identifier to the first user on the television when the score is determined to equal or exceed the second threshold.

10. The method of claim 9 further comprising the steps of:

communicating the displayed prize code identifier to the station; and awarding to the first user a prize corresponding to the displayed and communicated prize code identifier.

11. The method of claim 10 wherein the step of communicating the displayed prize code identifier to the station comprises the step of displaying a telephone number of the station on the television.

12. The method of claim 9 wherein the step of displaying the prize code identifier to the first user on the television comprises the step of displaying the prizes to the first user on the television to allow the first user to select a prize, when the score equals or exceeds the second threshold.

13. The method of claim 9 further comprising the step of the second user selecting an educational subject from the educational material for display on the television.

14. The method of claim 9 further comprising the steps of:

the second user selecting the first threshold; and the second user selecting the predetermined value for the duration of time the television is switched to the amusement material.

15. A method for controlling educational and amusement use of a television comprising the steps of:

displaying educational material on a television, the educational material containing at least one question;

scoring a first user's responses to questions in the educational material;

switching the television to amusement material, if the score is determined to equal or exceed a first threshold;

counting a number of times a game in the amusement material is played;

switching the television to the educational material when the count of the number of times equals a predetermined value;

a second user entering a prize code identifier and establishing the prize code identifier at a station, the prize code identifier having the purpose of identifying the second user;

the second user entering a second threshold for awarding a prize to the first user, if a score is determined to equal or exceed the second threshold; and displaying the prize code identifier to the first user on the television when the score is determined to equal or exceed the second threshold.

16. The method of claim 15 further comprising the steps of:

communicating the displayed prize code identifier to the station; and awarding to the first user a prize corresponding to the displayed and communicated prize code identifier.

17. The method of claim 16 wherein the step of communicating the displayed prize code identifier to the station comprises the step of displaying a telephone number of the station on the television.

18. The method of claim 16 wherein the step of displaying the prize code identifier to the first user on the television comprises the step of displaying the prizes to the first user on the television to allow the first user to select a prize, when the score equals or exceeds the second threshold.

19. The method of claim 15 further comprising the step of the second user selecting an educational subject from the educational material for display on the television.

20. The method of claim 15 further comprising the steps of:

the second user selecting the first threshold; and the second user selecting the predetermined value for the count of the number of times for playing a game in the amusement material.

21. The method of claim 15 further comprising the steps of:

counting the number of times the game in the amusement material is played; and erasing the game from storage when the count of the number of times the game is played equals a second predetermined value.

22. An apparatus for controlling educational and amusement use of a television comprising:

means for displaying educational material on a television, the educational material containing at least one question;

means for scoring a first user's responses to questions in the educational material;

means for a second user to enter a prize code identifier, the prize code identifier having the purpose of identifying the second user;

means for the second user to enter a threshold for awarding a prize to the first user, if a score is determined to equal or exceed the threshold; and means for displaying the prize code identifier to the first user on the television when the score is determined to equal or exceed the threshold.

23. The apparatus of claim 22 further comprising means for displaying a telephone number on the television for claiming the prize.

24. The apparatus of claim 23 wherein the means for displaying the prize code identifier to the first user on the television comprises means for displaying prizes to the first user on the television to allow the first user to select a prize, when the score equals or exceeds the threshold.

25. The apparatus of claim 23 further comprising:
   means for decoding the educational material from a received video signal; and
   means for storing the educational material.

26. The apparatus of claim 25 wherein the means for decoding the educational material from a received video signal comprises a vertical blanking interval decoder.

27. The apparatus of claim 22 further comprising:
   means for decoding the amusement material from a received video signal; and
   means for storing the amusement material.

28. The apparatus of claim 27 wherein the means for decoding the amusement material from a received video signal comprises a vertical blanking interval decoder.

29. An apparatus for controlling educational and amusement use of a television comprising:
   means for displaying educational material on a television, the educational material containing at least one question;
   means for scoring a first user's responses to questions in the educational material;
   means for switching the television to amusement material, if the score is determined to equal or exceed a first threshold;
   means for timing the duration of time the television is switched to the amusement material;
   means for switching the television to the educational material when the duration of time equals a predetermined value;
   means for a second user to enter a prize code identifier, the prize code identifier having the purpose of identifying the second user;
   means for the second user to enter a second threshold for awarding a prize to the first user, if a score is determined to equal or exceed the second threshold; and
   means for displaying the prize code identifier to the first user on the television when the score is determined to equal or exceed the second threshold.

30. The apparatus of claim 29 wherein the means for displaying the prize code identifier to the first user on the television when the score is determined to equal or exceed the second threshold comprises means for displaying a telephone number on the television for claiming the prize.

31. The apparatus of claim 29 wherein the means for displaying the prize code identifier to the first user on the television comprises means for displaying prizes to the first user on the television to allow the first user to select a prize, when the score equals or exceeds the second threshold.

32. The apparatus of claim 29 further comprising means for the second user to select an educational subject from the educational material for display on the television.

33. The apparatus of claim 29 further comprising:
   means for the second user to select the first threshold; and
   means for the second user to select the predetermined value for the duration of time the television is switched to the amusement material.

34. An apparatus for control ling educational and amusement use of a television comprising:
   means for displaying educational material on a television, the educational material containing at least one question;
   means for scoring a first user's responses to questions in the educational material;
   means for switching the television to amusement material, if the score is determined to equal or exceed a first threshold;
   means for counting a number of times a game in the amusement material is played;
   means for switching the television to the educational material when the count of the number of times equals a predetermined value;
   means for a second user to enter a prize code identifier, the prize code identifier having the purpose of identifying the second user;
   means for the second user to enter a second threshold for awarding a prize to the first user, if a score is determined to equal or exceed the second threshold; and
   means for displaying the prize code identifier to the first user on the television when the score is determined to equal or exceed the second threshold.

35. The apparatus of claim 34 wherein the means for displaying the prize code identifier to the first user on the television when the score is determined to equal or exceed the second threshold comprises means for displaying a telephone number on the television for claiming the prize.

36. The apparatus of claim 34 wherein the means for displaying the prize code identifier to the first user on the television comprises means for displaying prizes to the first user on the television to allow the first user to select a prize, when the score equals or exceeds the second threshold.

37. The apparatus of claim 34 further comprising means for the second user to select an educational subject from the educational material for display on the television.

38. The apparatus of claim 34 further comprising:
   means for the second user to select the first threshold; and
   means for the second user to select the predetermined value for the count of the number of times for playing a game in the amusement material.

39. The apparatus of claim 34 further comprising:
   means for counting the number of times the game in the amusement material is played; and
   means for erasing the game from storage when the count of the number of times the game is played equals a second predetermined value.

40. A method of controlling entertainment and educational use of a television having a screen, the method comprising the steps of:
   inhibiting use of the television screen for entertainment by enabling an educational device coupled to the television;
   initially displaying educational material and questions about the educational material on the screen when use of the television is desired;
   inputting to the educational device answers to the questions displayed on the screen;
   evaluating the inputted answers; and
   allowing use of the television screen for display of entertainment material instead of the educational material when the inputted answers satisfy a predetermined threshold number of correctly answered questions.

41. The method of claim 40 additionally comprising the steps of determining an amount of entertainment use of the television screen that is allowed, and inhibiting again the use of the television screen for display of entertainment material when the amount has expired.

42. The method of claim 41 wherein the amount is measured in units of time.

43. The method of claim 41, in which entertainment use of the television screen is for displaying a game having an end and the amount is measured by the number of times the game is played to its end.

44. The method of claim 41, in which entertainment use of the television screen is for displaying a game having a beginning and the amount is measured by the number of times the game is played from its beginning.

45. The method of claim 40, further comprising the steps of:
displaying a prompt to a user to enable or disable the educational device; and entering an identification code by the user to enable or disable the educational device.

46. The method of claim 40, further comprising the steps of:
selecting a subject of educational material; and
selecting the predetermined threshold number of correctly answered questions for the selected educational material.

47. The method of claim 40, further comprising the steps of:
downloading the educational material embedded in a video signal from a central station to the educational device; and
storing the educational material in a memory in the educational device.

48. The method of claim 40, further comprising the steps of:
measuring scores relating to answered questions, amount of time the television screen was used for entertainment, and amount of time the television screen was used for education; and
interrogating the educational device to determine scores relating to answered questions, amount of time the television screen was used for entertainment, and amount of time the television screen was used for education.

49. The method of claims 42, further comprising the step of selecting a time duration for allowing entertainment use of the television screen after the predetermined threshold is reached.

50. The method of claim 43 or 44, further comprising the step of selecting a number of times the game is played after the predetermined threshold is reached.

51. The method of claim 43 or 44 further comprising the steps of:
downloading the game embedded in a video signal from a central station to the educational device; and
storing the game in a memory in the educational device.

52. The method of claim 51, further comprising the step of erasing the game from the memory after the game is played a predetermined number of times.

53. A system for controlling educational and entertainment use of a television having a screen comprising:
a first source of electrical signals representing educational material and questions about educational material;
a second source of electrical signals representing amusement material;
switching means for connecting one of the sources to the television screen;
means for operating the switching means to automatically connect the first source to the television so as to display the educational material and the questions on the screen initially upon activation of the system, thereby inhibiting display of the amusement material on the screen;
a controller for inputting answers to questions displayed on the screen when the first source is connected to the television;
means for evaluating the inputted answers; and
means responsive to the evaluating means for automatically connecting the second source to the television to display the amusement material on the screen instead of the educational material and questions when the inputted answers satisfy a predetermined threshold number of correctly answered questions.

54. The system of claim 53 additionally comprising means for determining the amount of the amusement material that is displayed and means for unconnecting the second source from the television after a predetermined amount has been displayed.

55. The system of claim 53, in which the determining means measures the time that the second source is connected to the television and the unconnecting means.

56. The system of claim 53, in which the amusement material is a game having an end and the determining means counts the number of times the game is played to its end.

57. The system of claim 53 in which the amusement material is a game having a beginning and the determining means counts the number of times the game is played from its beginning.

58. The system of claim 53, in which the controller has a help key, the system additionally comprising a source of help material related to the questions and means for displaying the help material responsive to the help key.

59. The system of claim 53 further comprising:
timer means for measuring an amount of time the second signal source is connected to the television screen; and
wherein said operating means comprises means for directing the switching means to connect the first source of electrical signals to the television screen when the amount of time exceeds a predetermined time limit.

60. The system of claim 53, further comprising:
counter means for measuring a number of times a game carried by the second source of electrical signals is played when the second source is connected to the television screen; and
wherein said operating means comprises means for directing the switching means to connect the first source of electrical signals to the television screen when the number of times the game has been played equals a predetermined number of times.

61. The system of claim 53, further comprising:
tuner means for tuning to a television channel;
means for decoding data contained in a television signal on the television channel, the means for decoding being, coupled to the tuner means, and wherein the data comprises the educational material;
memory means coupled to the decoding means, the switching means and the first source of electrical signals for storing the educational material.

62. The system of claim 53, wherein the second source of electrical signals representing amusement material comprises means for multiplexing one of a plurality of sources of amusement material.

63. The system of claim 62, wherein the plurality of sources of amusement material includes a video game device.

64. The system of claim 63, wherein the plurality of sources of amusement material includes a television signal source.

65. The system of claim 53, further comprising: means for preventing a user from disconnecting the switching means from the television.

66. The system of claim 53, further comprising:

means for selecting a subject of educational material; and means for selecting the predetermined threshold number of correctly answered questions.

67. The system of claim 60, further comprising:

tuner means for tuning to a television channel;

means for decoding data contained in a television signal on the television channel, the means for decoding being coupled to the tuner means, and wherein the data comprises the amusement material; and memory means coupled to the decoding means, the switching means and the second source of electrical signals for storing the amusement material.

68. The system of claim 67, further comprising:

means for erasing the amusement material from the memory means when the game is played the predetermined number of times.

* * * * *

UNITED STATES PATENT AND TRADEMARK OFFICE
CERTIFICATE OF CORRECTION

PATENT NO. : 5,716,273
DATED : February 10, 1998
INVENTOR(S) : Henry C. Yuen

It is certified that error appears in the above-identified patent and that said Letters Patent is hereby corrected as shown below:

Abstract, line 9, replace "the, controller" with -- the controller --.
Column 1, line 65, replace "affect" with -- effect --.
Column 2, line 16, replace "a eductional" with -- an educational --.
Column 3, line 28, replace "a interlaced" with -- an interlaced --.

Column 8, lines 34,35, replace "TELEVISION RECEIVERS⇆;"
       Title 47 C.F.R., Part 73,682(a)(22)," with
       -- TELEVISION RECEIVERS"; Title 47 C.F.R.,
       Part 73.682(a)(22), --.
Column 8, line 45, replace "EIA-608" standard"" with
       -- "EIA-608 standard" --.
Column 9, line 37, after "transmitted" insert -- by --.
Column 11, line 11, change "FIG. 91" to -- FIG. 91 --.
Column 11, line 42, replace "station has a" with -- station has an --.
Column 15, line 9, change "claim 23" to -- claim 22 --.
Column 15, line 66, change "control ling" to -- controlling --.
Column 17, line 44, change "claims 42" to -- claim 42 --.

Signed and Sealed this

Twenty-second Day of December, 1998

Attest:

BRUCE LEHMAN

*Attesting Officer*        *Commissioner of Patents and Trademarks*